Feb. 27, 1934.  M. E. WIDELL  1,948,553
APPARATUS FOR PREPARING CONTAINER BLANKS
Filed Jan. 1, 1931   16 Sheets-Sheet 1
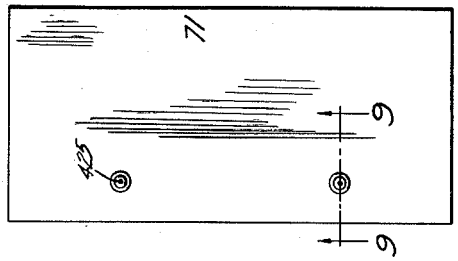
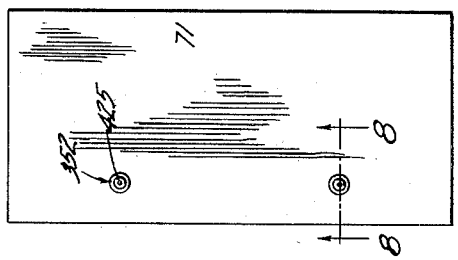
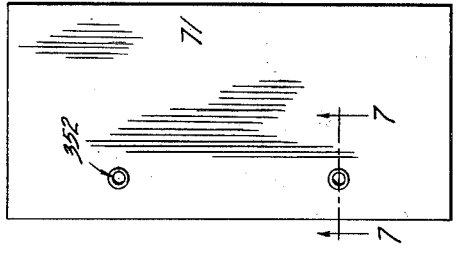
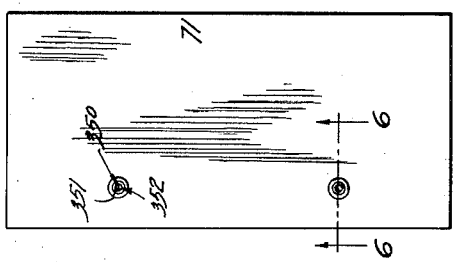
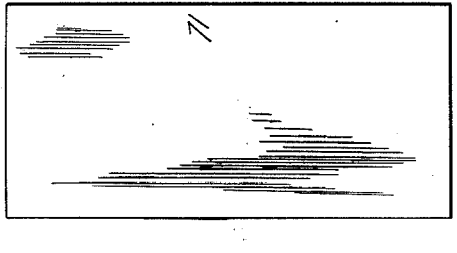
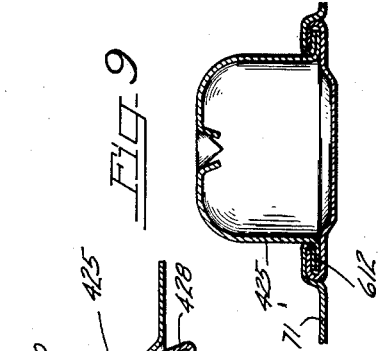
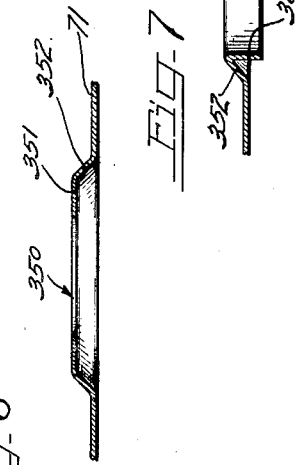
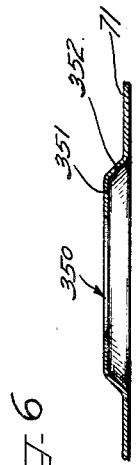
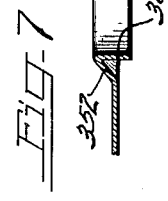
INVENTOR
Magnus E. Widell
BY
John C. Carpenter
ATTORNEY

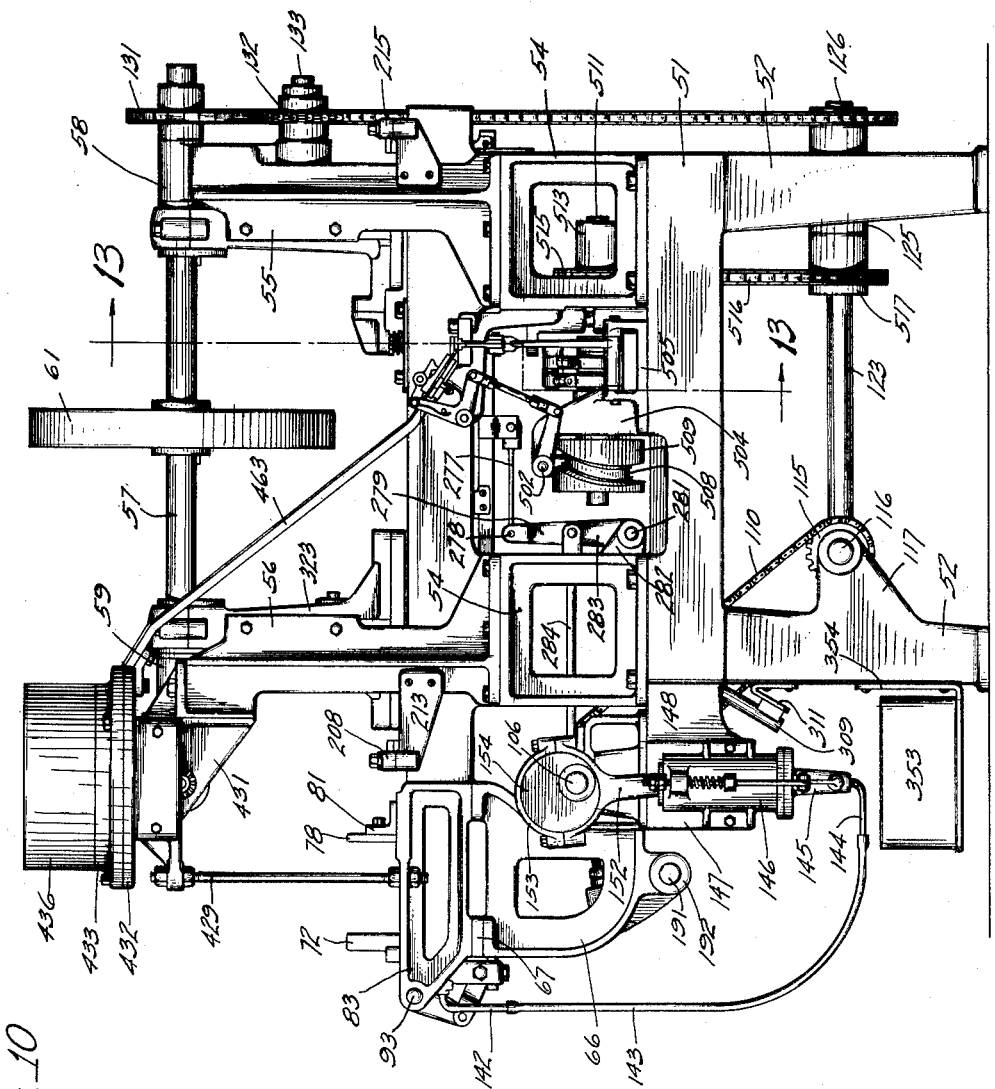

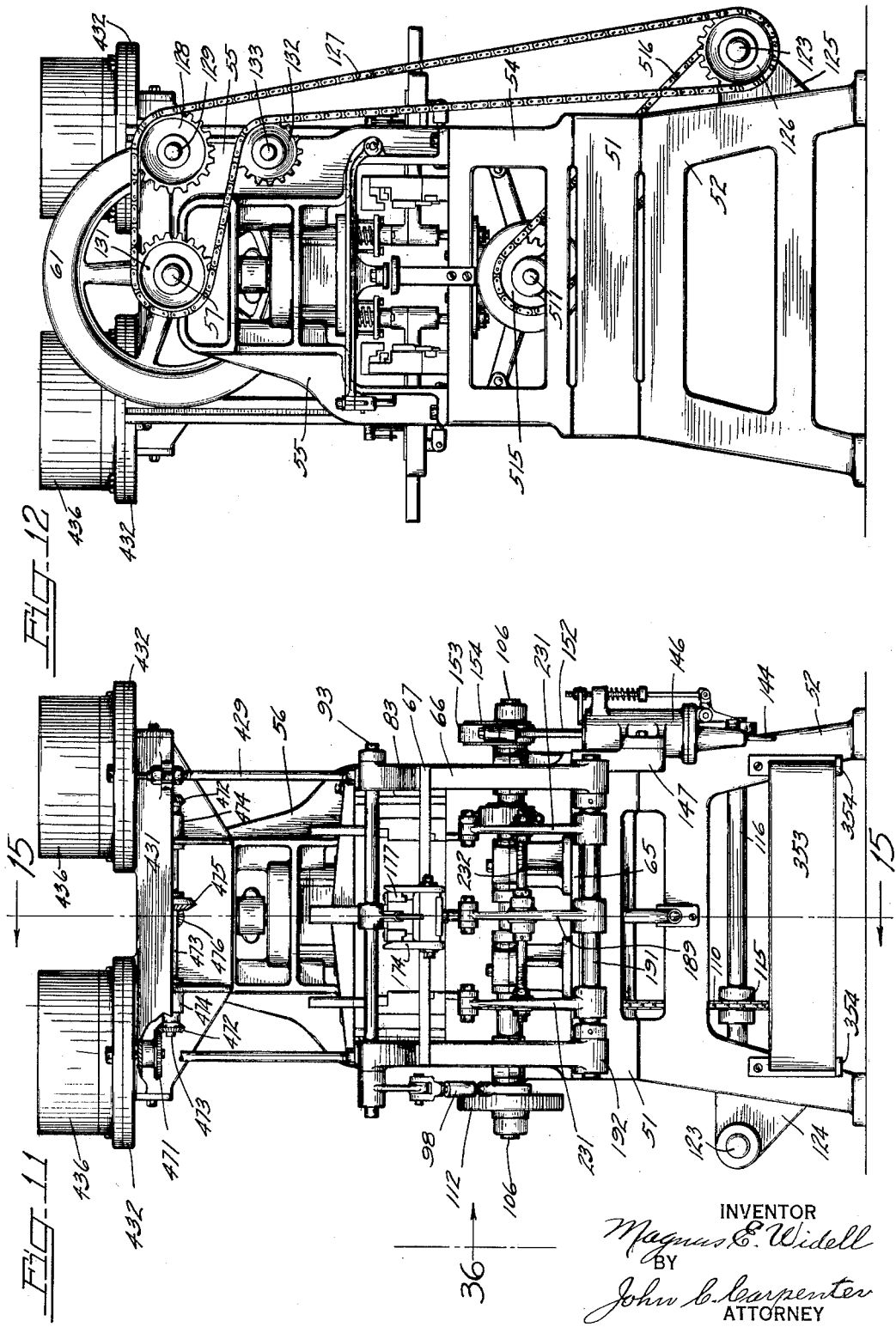

Feb. 27, 1934.    M. E. WIDELL    1,948,553
APPARATUS FOR PREPARING CONTAINER BLANKS
Filed Jan. 1, 1931    16 Sheets-Sheet 4
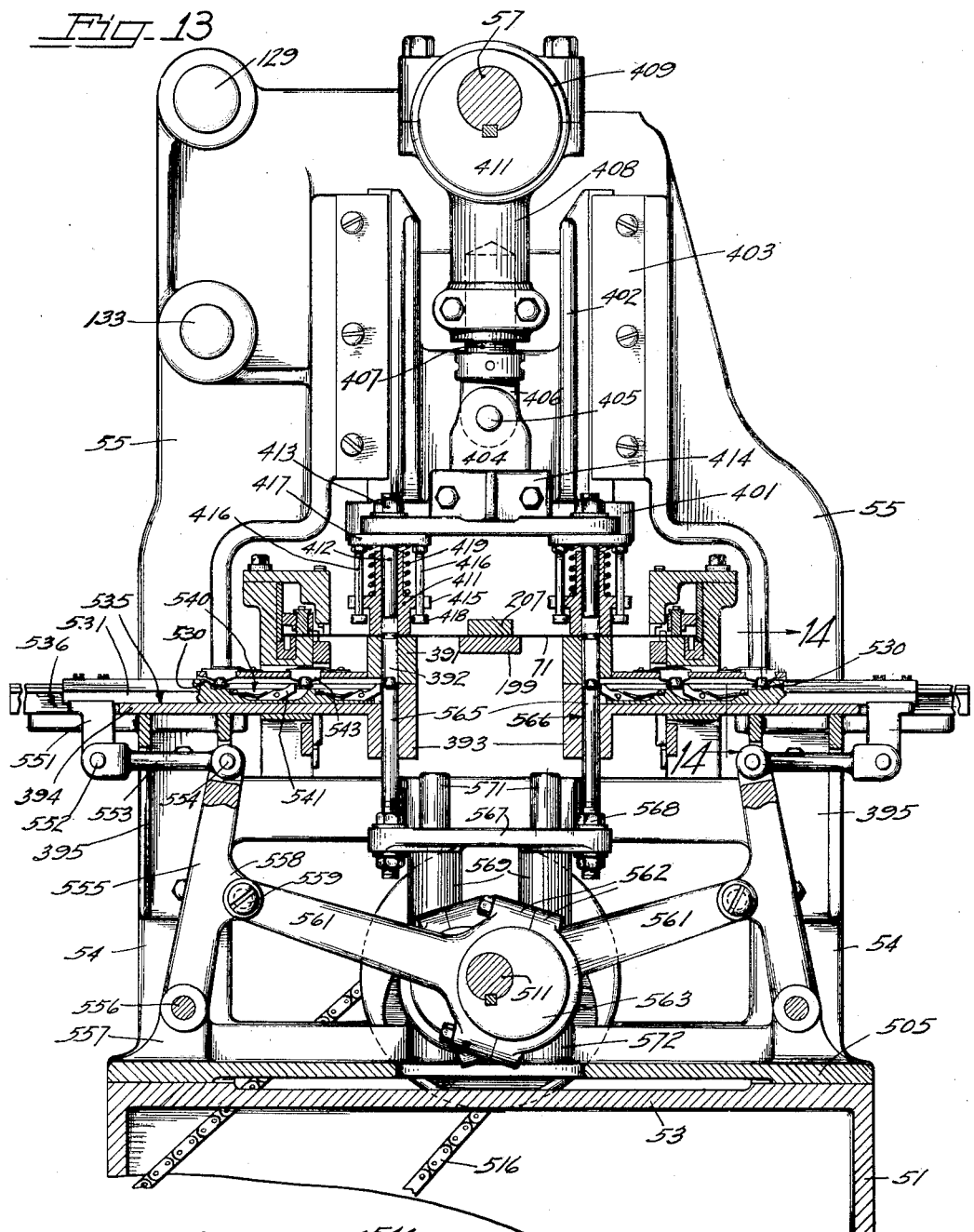
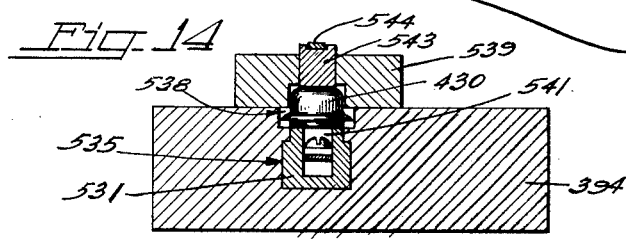
INVENTOR
Magnus E. Widell
BY
John C. Carpenter
ATTORNEY

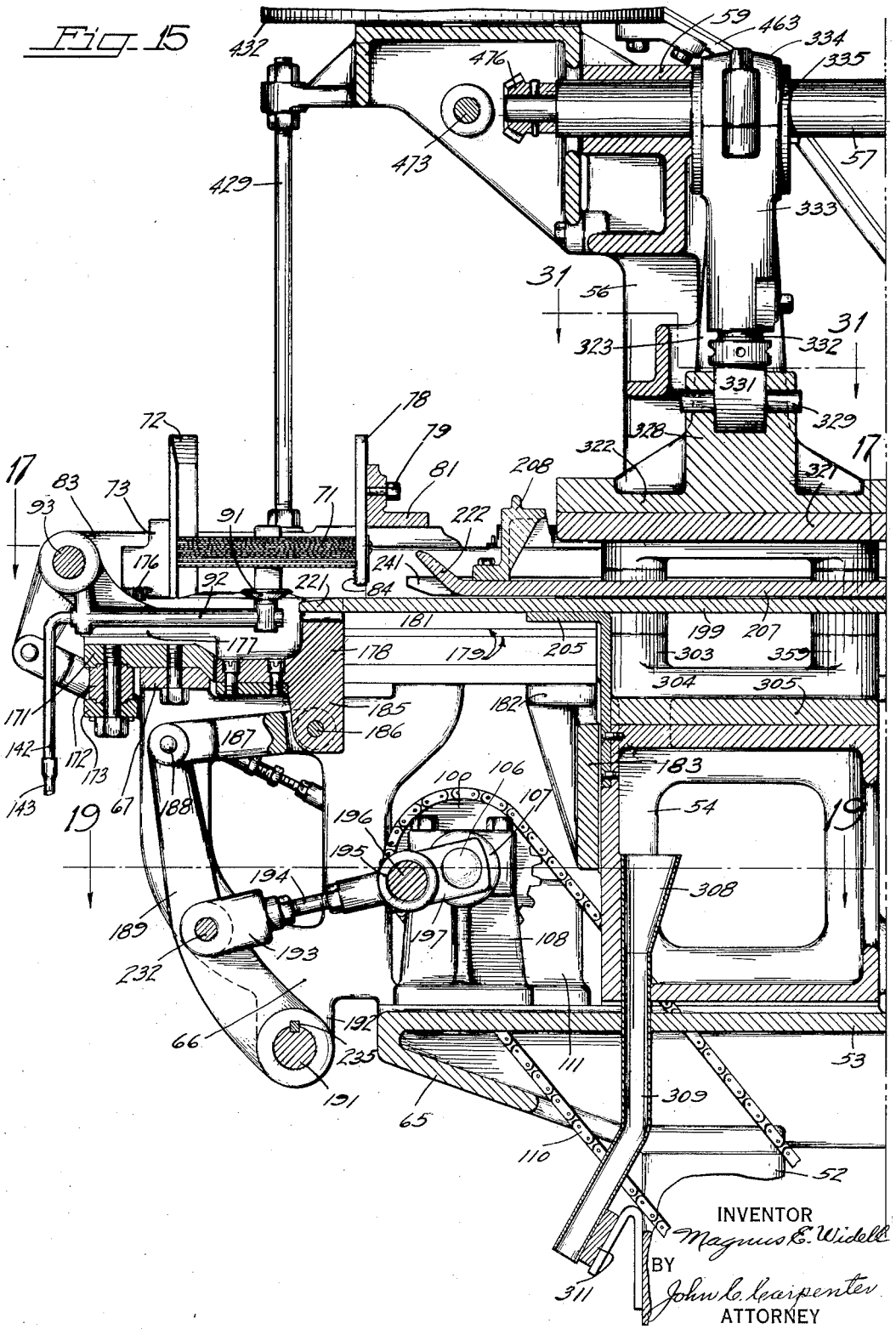

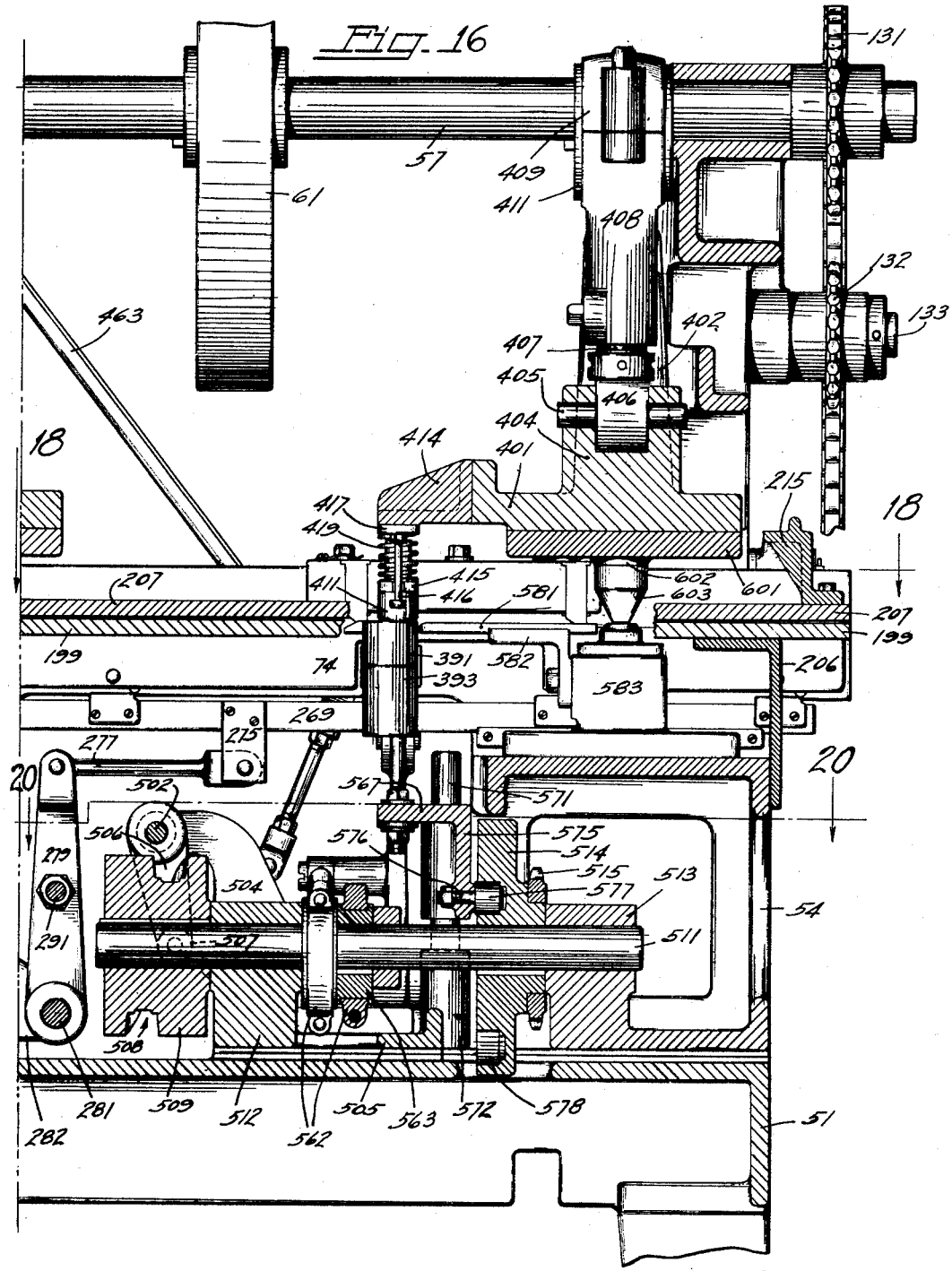

Feb. 27, 1934.     M. E. WIDELL     1,948,553
APPARATUS FOR PREPARING CONTAINER BLANKS
Filed Jan. 1, 1931      16 Sheets-Sheet 7

INVENTOR
Magnus E. Widell
BY
John C. Carpenter
ATTORNEY

Feb. 27, 1934. M. E. WIDELL 1,948,553
APPARATUS FOR PREPARING CONTAINER BLANKS
Filed Jan. 1, 1931 16 Sheets-Sheet 8

INVENTOR
Magnus E. Widell
BY
John C. Carpenter
ATTORNEY

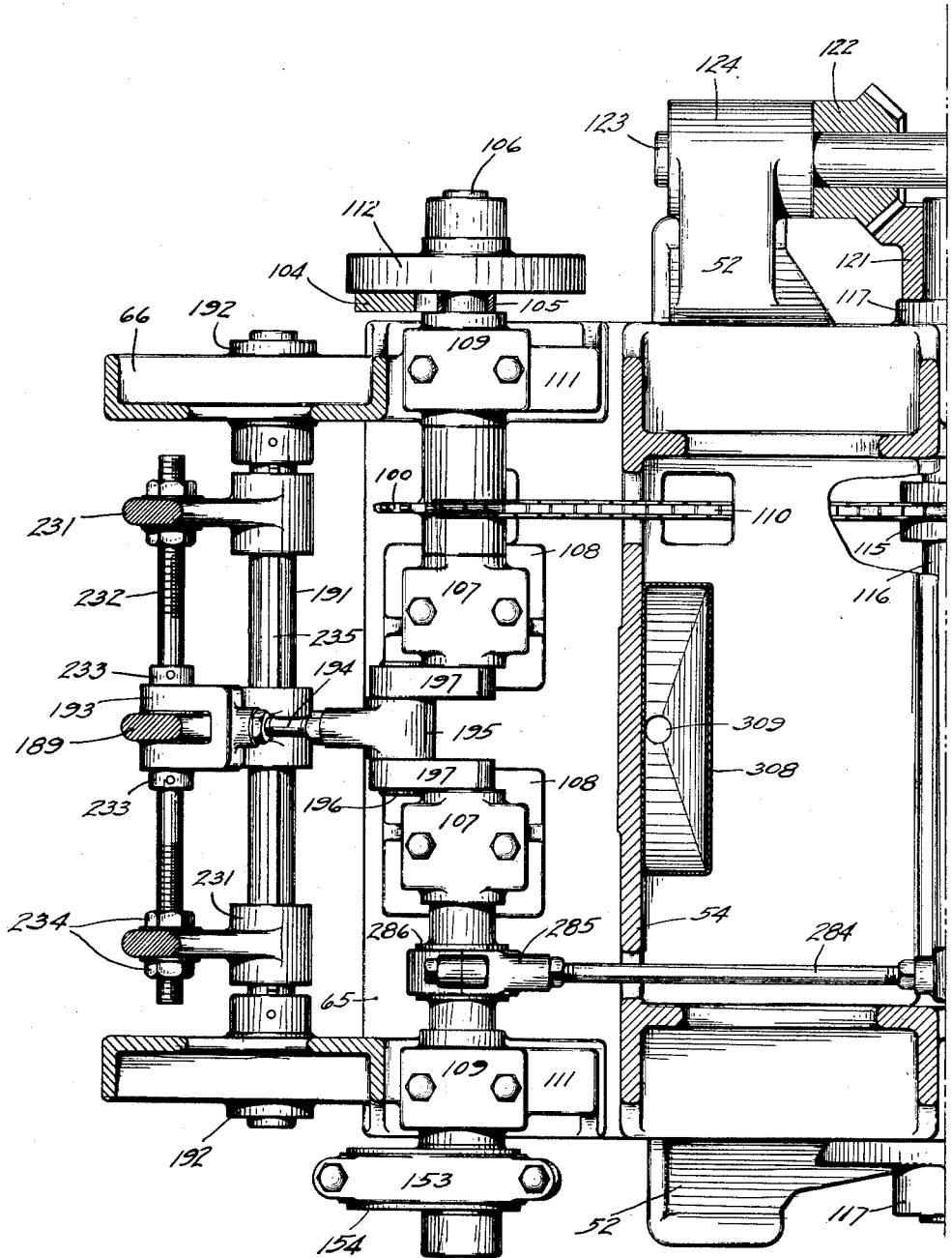

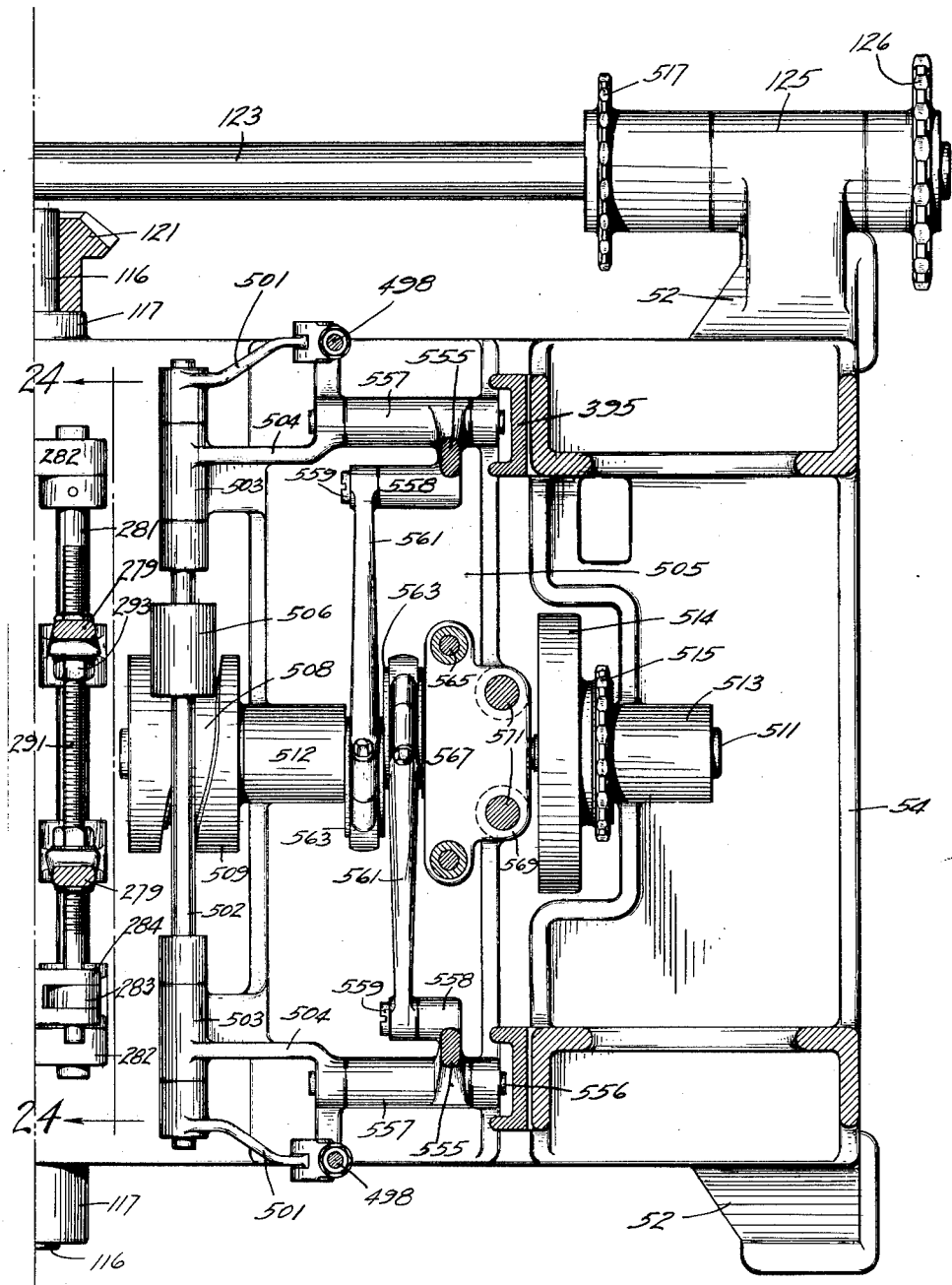

Feb. 27, 1934.　　　　　M. E. WIDELL　　　　　1,948,553
APPARATUS FOR PREPARING CONTAINER BLANKS
Filed Jan. 1, 1931　　　16 Sheets-Sheet 11
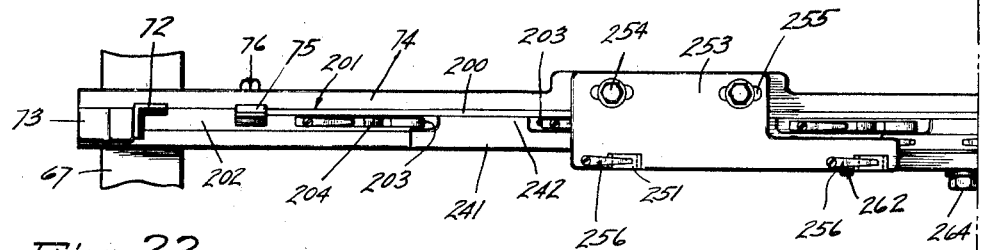
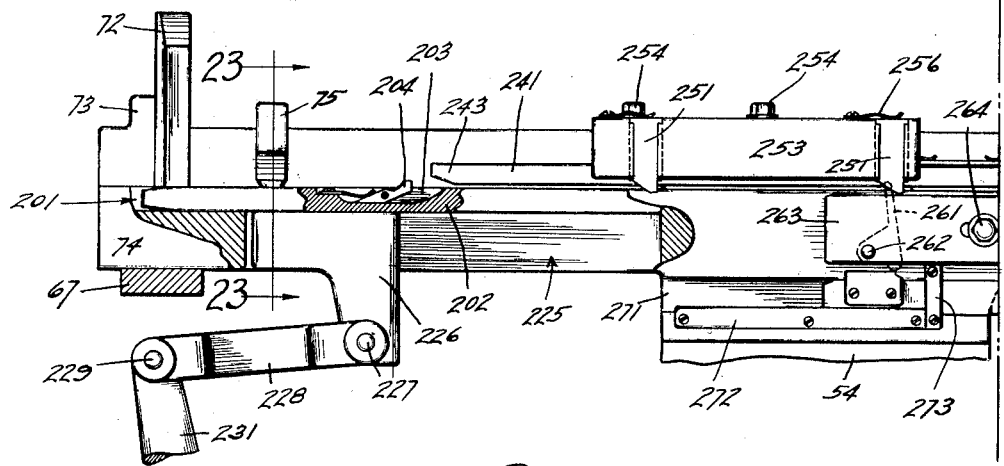
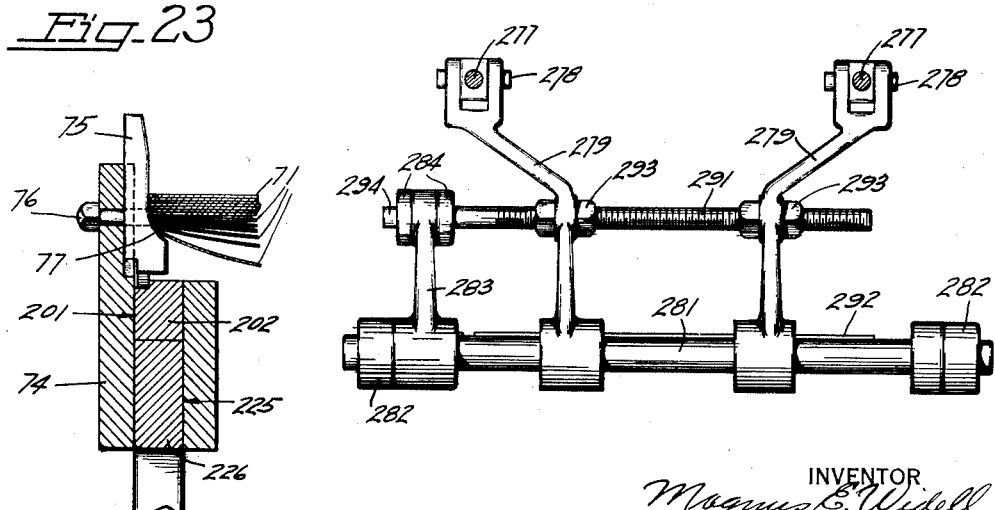
INVENTOR
Magnus E. Widell
BY
John C. Carpenter
ATTORNEY Feb. 27, 1934.  M. E. WIDELL  1,948,553
APPARATUS FOR PREPARING CONTAINER BLANKS
Filed Jan. 1, 1931  16 Sheets-Sheet 12
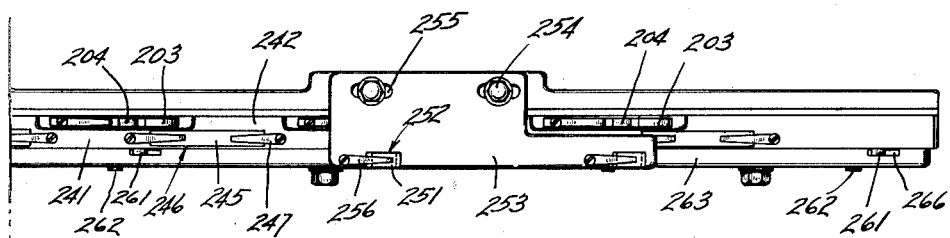
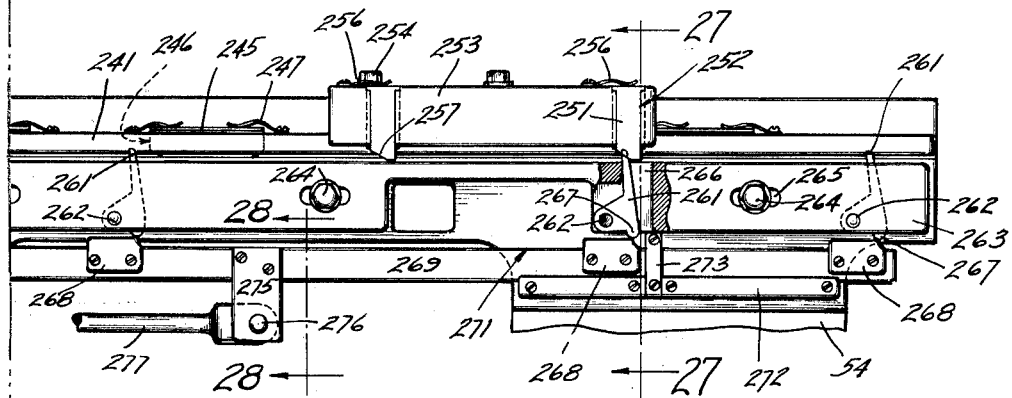
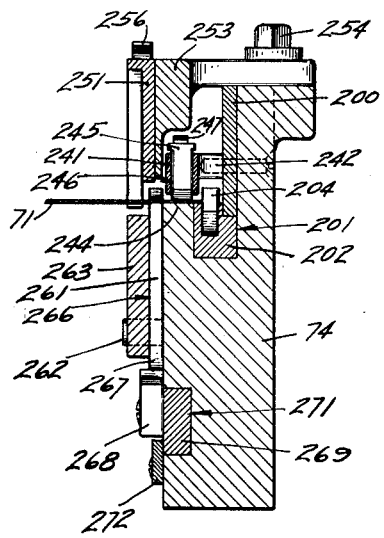
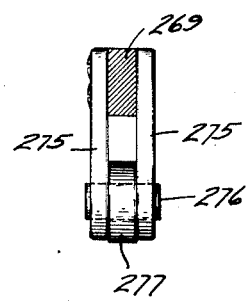
INVENTOR
Magnus E. Widell
BY
John C. Carpenter
ATTORNEY

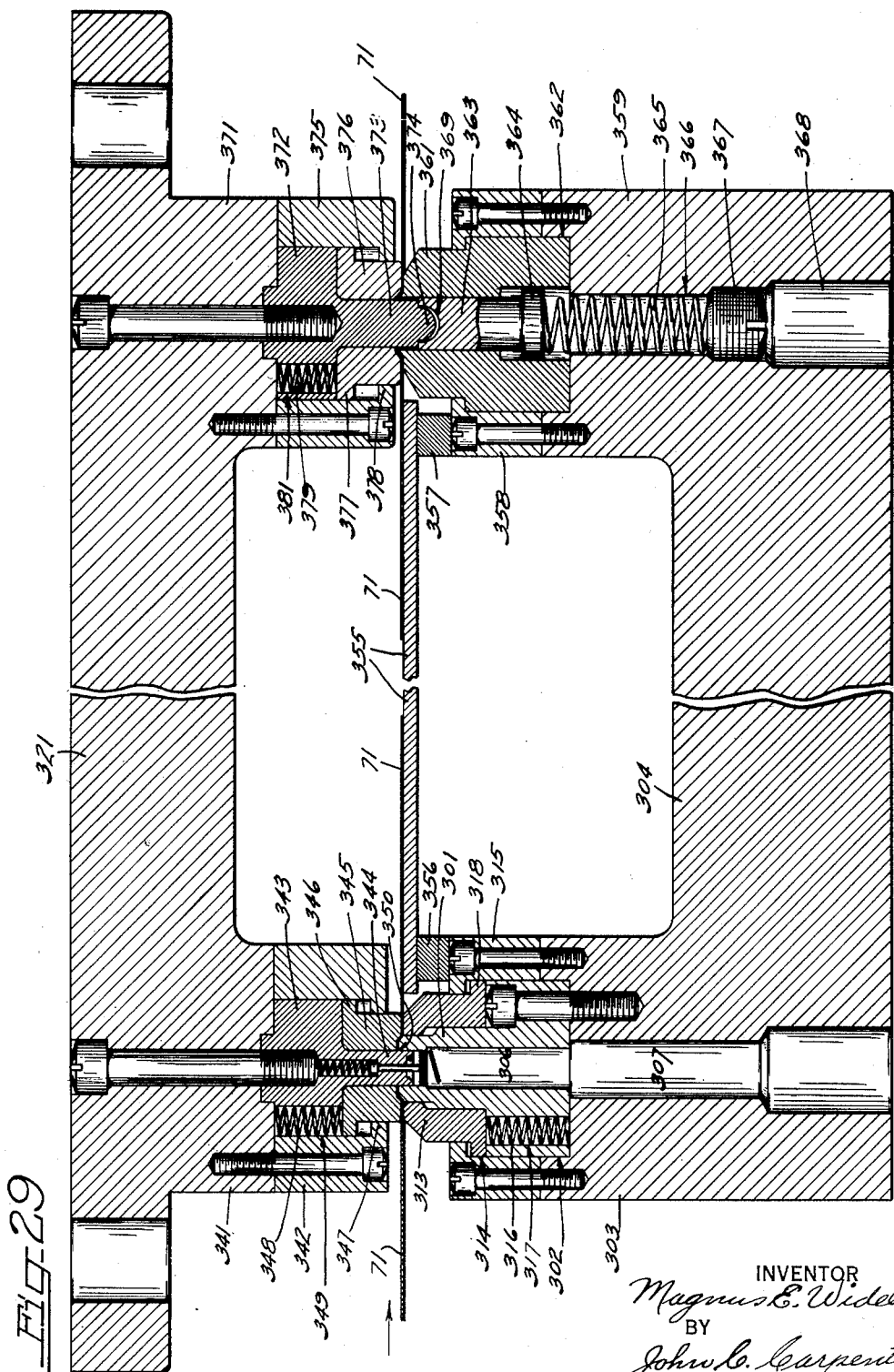

Feb. 27, 1934.  M. E. WIDELL  1,948,553
APPARATUS FOR PREPARING CONTAINER BLANKS
Filed Jan. 1, 1931  16 Sheets-Sheet 14

INVENTOR
Magnus E. Widell
BY
John C. Carpenter
ATTORNEY

Feb. 27, 1934.  M. E. WIDELL  1,948,553
APPARATUS FOR PREPARING CONTAINER BLANKS
Filed Jan. 1, 1931   16 Sheets-Sheet 16

INVENTOR
Magnus E. Widell
BY
John C. Carpenter
ATTORNEY

Patented Feb. 27, 1934

1,948,553

UNITED STATES PATENT OFFICE 1,948,553

APPARATUS FOR PREPARING CONTAINER BLANKS

Magnus E. Widell, Cincinnati, Ohio, assignor to American Can Company, New York, N. Y., a corporation of New Jersey Application January 1, 1931. Serial No. 506,000

17 Claims. (Cl. 113—1)

The present invention relates to an apparatus for preparing container blanks that are subsequently to be formed into container bodies of the bail or handle type, the invention having particular reference to securing bail ears on the container blank.

The invention contemplates mechanism for performing a series of operations on a container blank wherein the blank is first punched and the adjacent metal bent into seat form to receive bail ears, which are thereafter automatically delivered to the formed seats and secured in position.

The principal object of the present invention is the provision of interconnected automatically operating devices which act upon container blanks and provide bail ear seats therein, which separate individual bail ears from a mass of ears, which assemble an ear on each seat and which secure each ear firmly in place on the blank, thereby preparing the container blanks for subsequent container manufacture not involved in the present invention.

The invention contemplates the use of accurately timed feeding devices for successively presenting container banks to a series of operating stations, and to the use of other accurately timed feeding devices for delivering bail ears to the container blanks and to certain of the operating stations, whereby the blanks, after passing through the various operations, issue from the machine with properly positioned bail ears secured thereon.

A further important object of the invention is the provision of automatic mechanism for forming bail ear seats in container blanks, for feeding a two part bail ear to each seat and for further interfolding parts of the container blank and parts of the bail ears to securely unite the two parts of each ear together as well as to unite these parts with the blank.

Numerous other objects of the invention will be apparent as it is better understood from the following description, which, taken in connection with the accompanying drawings, discloses a preferred embodiment thereof.

Referring to the drawings:

Figure 1 is a plan view of a container blank as received into the apparatus of the present invention;

Fig. 2 is a view of the blank after it has passed through the operations of the first operating station;

Fig. 3 is a view similar to Fig. 2 illustrating the result of the second operation on the container blank;

Fig. 4 is a view similar to Fig. 2 illustrating a blank after it has received a pair of bail ears at the third operating station;

Fig. 5 is a view similar to Fig. 2 illustrating the results of the final operation wherein the bail ears are secured to the container blank;

Fig. 6 is an enlarged sectional view of a portion of the blank taken along the line 6—6 in Fig. 2;

Fig. 7 is a similar enlarged view taken along the line 7—7 in Fig. 3;

Fig. 8 is an enlarged view of a part of the container blank and an assembled bail ear taken along the line 8—8 in Fig. 4;

Fig. 9 is an enlarged view similar to Fig. 8 as taken along the line 9—9 in Fig. 5;

Fig. 10 is a side elevation of an apparatus embodying the present invention;

Fig. 11 is a rear end elevation thereof;

Fig. 12 is a front end elevation thereof;

Fig. 13 is an enlarged transverse sectional view taken substantially along the line 13—13 in Fig. 10;

Fig. 14 is an enlarged detail of the bail ear cross feed taken substantially along the broken line 14—14 in Fig. 13;

Fig. 15 is an enlarged longitudinal sectional view of the rear half of the apparatus being taken substantially along the line 15—15 in Fig. 11;

Fig. 16 is a similar section of the front half of the apparatus, this figure taken together with Fig. 15 forming the complete longitudinal section;

Fig. 19 is a sectional plan view, taken along the line 19—19 in Fig. 15, illustrating the rear half of the machine along this plane;

Fig. 20 is a view similar to Fig. 19 being taken along the line 20—20 in Fig. 16 and completing in connection with Fig. 19 the sectional plan of the apparatus at this position;

Fig. 21 is a plan view of the rear half of one of the feed bar frame units;

Fig. 22 is a side elevation partly broken away of the rear half of feed bar frame unit;

Fig. 23 is an enlarged transverse sectional detail taken substantially along the line 23—23 in Fig. 22;

Fig. 24 is a transverse sectional detail taken substantially along the line 24—24 in Fig. 20;

Fig. 25 is a plan view similar to Fig. 21 illustrating the front half of the feed bar frame unit, these two figures when joined together along the dot and dash line completing the plan of the unit;

Fig. 26 is a view similar to Fig. 22 illustrating the front half of the feed bar frame unit, Figs. 22 and 26 being joined along the dot and dash line to complete the elevation;

Fig. 27 is an enlarged transverse sectional view taken along the line 27—27 in Fig. 26;

Fig. 28 is an enlarged sectional view taken along the line 28—28 in Fig. 26;

Fig. 29 is an enlarged longitudinal sectional view taken along the line 29—29 in Fig. 17;

Figure 17:
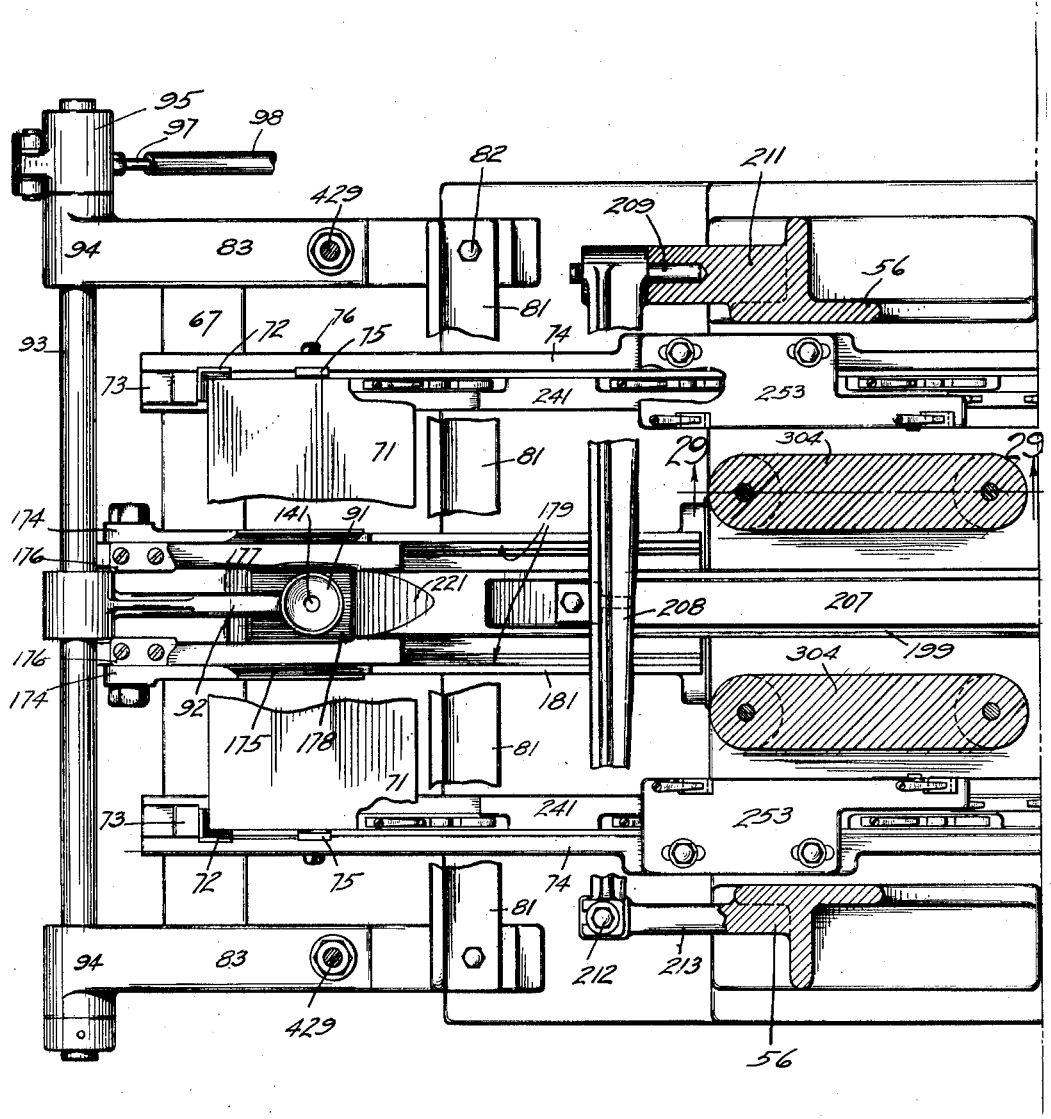
Fig. 17 is a sectional plan view of the rear half of the apparatus being taken along the line 17—17 in Fig. 15.

The apparatus of the present invention comprises a frame capable of supporting the various parts of the machine and providing a central pass for container blanks. In this apparatus the blanks are positioned in stacked formation within a magazine from which the lowermost blanks are successively separated from the stack by an oscillating suction arm connected with a self-contained vacuum pump. Each separated blank is initially engaged by a feeding device which advances it one step along the pass.

A pair of feeding bar frame units are supported upon stationary parts of the apparatus and extend substantially the length of the machine and the advancing blank is brought to rest on top of these units. Reciprocating feed bars carrying spring pressed feed dogs provide the conveying elements of these feeding bar units, the dogs of each bar engaging the rear edge of the blank and advancing it along the pass in a step by step movement through a series of operating stations. These stations are each duplicated, there being a series of stations on the right and a corresponding series on the left of the center of the pass.

At each first operating station, a hole is punched through the blank and the metal surrounding the hole is formed into an incomplete bail ear seat. At the following pair of stations the partially formed ear seats are subjected to further shaping devices which complete the ear seats preparatory to receiving the bail ears.

A pair of bail ear magazines are provided in each of which a suitable hopper is used for retaining a collection of bail ears. Stirring and delivering devices separate the individual bail ears from the mass in the magazine and align them in processional order in which formation they move by gravity downwardly along a discharge chute. Near the bottom end of each chute, the bail ears are successively segregated or cut out and fed individually into a cross feed device.

Each bail ear cross feed device comprises a sliding feed bar which advances the ear intermittently first through an intermediate idle station and then into axial alignment with one of the formed ear seats of the container blank positioned above and held at the assembling station. Each bail ear is thereupon lifted and inserted within the aligned seat opening of the container blank.

The blank with its assembled ears is then advanced into the final pair of stations where clinching dies interfold parts of the ear and the blank to complete their union.

*General frame*

The apparatus illustrated in the drawings comprises a bed 51 (Figs. 10 to 13 inclusive) supported by legs 52, the bed having a horizontal top web 53 on which is bolted two spacer frames 54. One of the spacer frames 54 supports an upwardly extending bracket 55 positioned adjacent the front end of the machine. The other spacer frame supports an upwardly extending bracket 56 located adjacent the rear end of the machine.

A drive shaft 57 is journaled in bearings 58 and 59 formed respectively in the brackets 55 and 56 and is rotated in any suitable manner as by application of driving power to a belt pulley 61. The bed 51 is formed with a rear extension 65 (Figs. 11 and 15) on which are located two spaced blank magazine frames 66. A tie plate 67 connects the two frames 66 and is secured on their upper edges. This plate supports parts of the container blank magazine.

*Container blank magazine feed*

Container blanks 71 (Figs. 15, 17 and 23) are arranged in stacked formation within a blank magazine holder located adjacent the rear end of the machine. This holder comprises a pair of vertically extending angle irons 72 spaced on opposite sides of the machine, each angle iron being supported in a bracket 73 secured to a longitudinally extended frame 74 forming part of the feed bar frame unit. Each bar frame 74 (Figs. 22 and 26) is supported at its rear end on the tie-plate 67, at its forward end on the forward spacer frame 54 and intermediate its length on the rear spacer frame 54.

The angle irons 72 act as corner guides for the stack of blanks 71 which are longitudinally confined between blocks 75 secured by bolts 76 to the inner side of each of the bar frames 74. Each block 75 (Fig. 23) is provided with a curved supporting ledge 77, the shape of which acts upon the lowermost blanks partially to separate them.

The forward edges of the blanks in the magazine abut against a vertical stop plate 78 which is bolted at 79 near the center of an angle iron 81 secured at its ends by bolts 82 to the upper edge of spaced brackets 83 (Figs. 10 and 11) secured at the rear upon the tie-plate 67 and at the front upon the magazine frame 66. The lower end of the plate 78 carries a series of projecting edge members 84 (Fig. 15) which assists in separating the lowermost container blank 71 as it is withdrawn downwardly from the stack.

The mechanism employed for positively removing this lowermost blank from the stack comprises a sucker head 91 (Figs. 15 and 17) carried on the forward end of a hollow arm 92 secured to a rockshaft 93 journaled in bearings 94 formed in the brackets 83.

Figure 36:
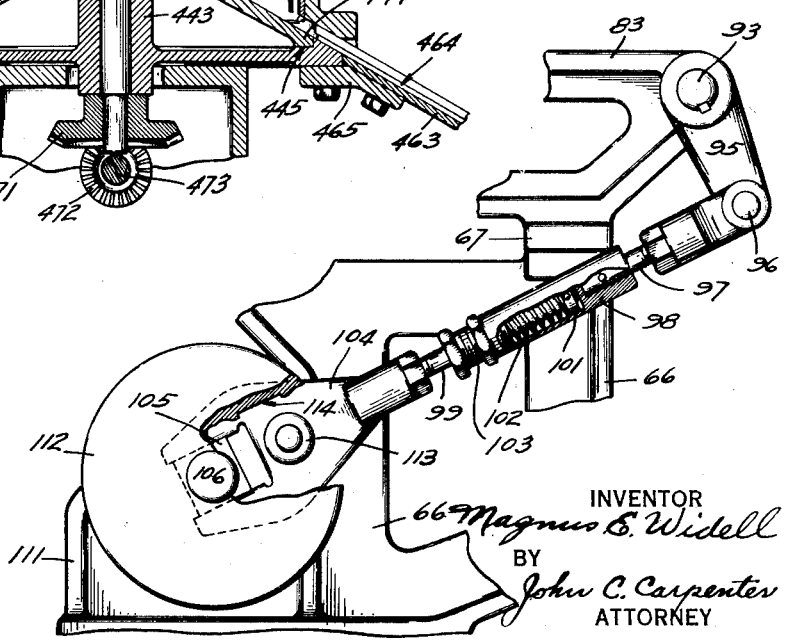
Fig. 36 is a fragmentary side elevation, partly broken away of part of the container blank suction feed device.

The shaft 93 is oscillated back and forth to swing the arm 92 upwardly and to position the sucker head 91 against the lowermost blank in the magazine and thence downwardly, the sucker head 91 adhering to the lowermost blank and withdrawing it from the magazine. The shaft 93 carries an arm 95 (see also Fig. 36) which is pivotally connected at 96 to a rod 97 pinned to a sleeve 98 which has a yielding connection with a rod 99 extending into the sleeve and carrying a collar 101.

A spring 102 is located within the sleeve 98 and surrounds the end of the rod 99 being confined between the end wall of the sleeve and an adjusting nut 103 threaded into the opposite open end of the sleeve. By means of this construction a desired compression may be imposed on the spring and the desired yielding connection obtained as a safety measure. The opposite end of the rod 99 is connected with a cam yoke 104 which has sliding movement over a block 105 carried on a horizontal blank feed shaft 106. The shaft 106 (Figs. 15 and 19) is journaled in intermediate bearings 107 formed in brackets 108 carried by the magazine frame extension 65 and in end bearings 109 formed in bracket portions 111 of the magazine frame 66.

The shaft 106 on one end carries a face cam 112, this being located adjacent the cam yoke 104. A cam roller 113 (Fig. 36) is rotatably mounted on the yoke 104 and operates within a cam groove 114 formed in one face of the cam 112. The shaft 106 also carries a sprocket 100 (Figs. 10, 15 and 19) over which operates a chain 110 which also passes over a second sprocket 115 carried by a transverse horizontal shaft 116 journaled in bearings 117 (see also Fig. 20) formed in the rear leg 52.

The transverse shaft 116 carries at one end a bevel gear 121 which meshes with a similar gear 122 secured to an intermediate shaft 123 (Figs. 11, 12, 19 and 20) journaled in a bearing 124 formed in the rear leg 52 and in a bearing 125 formed in the front leg 52. The intermediate shaft 123 carries at its opposite end a sprocket 126. A chain 127 operates over the sprocket 126, over an idler sprocket 128 (rotatably mounted on a stud 129 projected from the front bracket 55), over a sprocket 131 (keyed to one end of the drive shaft 57) and over an idler sprocket 132 (rotatably mounted on a stud 133 projected outwardly from the bracket 55). This gives the proper timed movement to the arm 92 and its sucker head 91.

Figure 33:
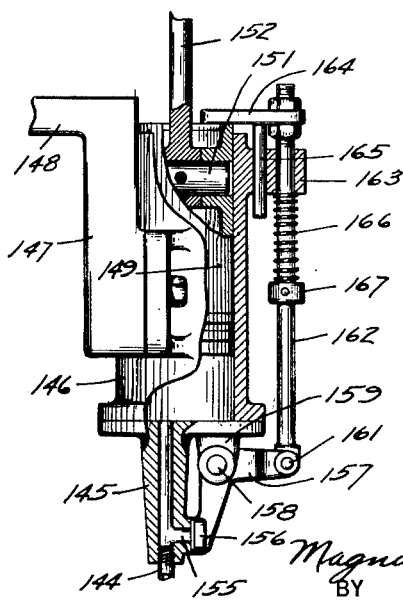
Fig. 33 is an enlarged part elevation, part section of the vacuum pump, parts being broken away.

Suction is maintained in the sucker head 91 by connection with a vacuum pump, the sucker head 91 being provided with a central opening 141 (Fig. 17) which communicates with the hollow interior of the arm 92. A pipe 142 (Figs. 10 and 15) is connected with one end of the hollow arm 92, the interior of the pipe thus communicating through the arm 92 with the opening 141 of the head. A flexible pipe 143 is connected to the lower end of the pipe 142 and extends downwardly into connection with a pipe 144 (see also Fig. 33) which is screwed into the lower end of a cylinder head 145 which closes one end of a cylinder 146 bolted to a bracket 147 secured to an extension 148 of the bed 51.

A piston 149 has sliding movement within the cylinder 146 and is pivotally connected at 151 to an arm 152 enlarged at its opposite end and formed as an eccentric strap 153 (Figs. 10 and 19) embracing an eccentric 154 secured to the shaft 106. Rotation of the shaft 106 causes the piston 149 to move up and down within its cylinder 146 and at certain periods in its stroke to exhaust the air from the suction head 91, the arm 92 and the pipes 142, 143 and 144.

This suction impulse is properly timed with the movement of the suction head 91 so as to provide a drawing force just after the head is raised into engagement with the lowermost blank 71 in the magazine. The suction continues during the withdrawal of the blank from the magazine and as the arm 92 reaches its lowermost position, the vacuum is broken by a trigger mechanism, illustrated in Figs. 10 and 33.

A transverse port 155 is formed in the head 145 and communicates with the interior of the cylinder 146 and with the outside atmosphere. This transverse port is covered during the blank withdrawing operation by a valve 156 carried on one arm of a bellcrank lever 157 oscillating on a pivot 158 carried in lugs 159 projected from the head 145. The opposite arm of the bell crank lever 157 is pivoted at 161 to one end of a rod 162 having sliding movement in a boss 163 formed in the wall of the cylinder, 146, the opposite end of the rod 162 carrying a finger 164 which projects over the open upper end of the cylinder.

This finger 164 carries a locating pin 165 which has sliding movement in the boss 163 and this serves to guide and steady the rod 162 at it moves up and down. A spring 166 surrounds the rod 162 and tends to force the rod downwardly pressing against a collar 167 pinned to the rod. The rod 162 is raised by action of the piston 149 and is lowered by action of the spring 166.

As the piston 149 is raised and approaches the end of its upward travel, its upper edge engages the overhanging finger 164 and lifts it with the rod 162 which thereby oscillates the bellcrank lever 157 about its pivot 158 and removes the valve member 156 from its seat uncovering the end of the transverse opening 155. Air immediately flows into the pipe 144 and thence through pipes 143 and 142 into the arm 92 and sucker head 91, thereby breaking the suction action of the head and causing it to release the withdrawn blank 71.

*Container blank bar feeds*

The tie-plate 67 (Figs. 11, 15 and 17) carries intermediate its length a plate 171 to which are bolted spacer blocks 172 and 173 supporting spaced side plates 174. These plates 174 extend forwardly on opposite sides of the sucker head 91 and are provided with chamfered upper edges 175 on which the withdrawn blank 71 is positioned by the descending sucker head 91. In this position, the blank rests with its rear edge in front of two spaced blocks 176 of an initial feed device.

The blocks 176 are fastened to the upper rear ends of extensions 177 of a slide 178 which has sliding movement within guideways 179 formed in spaced plates 181 mounted upon and extending between the tie-plate 67 and brackets 182 formed in a cross bar 183 bolted to the rear face of the rear spacer frame 54. The slide 178 at its forward end is projected downwardly at 185 to provide a pivotal connection 186 for a link 187 pivoted at 188 to the upper end of an arm 189 (see also Fig. 19) keyed to a rockshaft 191 oscillating in bearings 192 formed in the frames 66.

The arm 189 is pivotally connected to a block 193 which threadedly engages an adjustable link 194 connecting with a pitman 195. The pitman 195 encircles a crank 196 formed centrally in the shaft 106, arms 197 offsetting the crank from the axis of the shaft.

After the withdrawn blank 71 is deposited upon the upper edges of the plates 174, the slide 178 advances and its blocks 176 engage the rear edge of the blank and move it forward out of alignment with the blank magazine. In this forward movement the blank advances over the upper surfaces of the feed bar units and comes to rest in a position to be engaged by the feeding elements of the feed bar units.

Each bar frame 74 (Figs. 21, 22, 23, 25, 26 and 27) is provided with a longitudinal slot 201 in which is slidably mounted a feed bar 202 held against upward displacement by a spacer plate 200 secured to the frame 74 in the upper part of the slot 201. Each bar 202 is slotted at spaced intervals, as indicated by the numeral 203, and spring held feed dogs 204 are pivotally positioned therein. The rear set of feed dogs 204 in the two feed bars 202 engage the blank as it is released from the initial feeding device and advance it progressively through the various operation stations of the machine.

The blank 71 during this passage is supported along its median line by a plate 199 (Figs. 15, 16 and 17) carried at its rear end on an angle bracket 205 secured to the rear face of the spacer frame 54 adjacent the cross bar 183 and at its forward end upon a similar angle bracket 206 secured to the forward face of the front spacer frame 54. The blank adjacent its two ends is supported upon the feed bars 202 and parts of the bar frames 74.

The blank during this passage over the support 199 is held against upward displacement by a guide plate 207. This plate is suspended at its rear end from a transverse arm 208 (see also Fig. 10) pivotally connected at one side to a stud 209 carried by a boss 211 formed in the rear bracket 56 and is bolted at its opposite side as at 212 to a bracket 213 carried by the bracket 56. The forward end of the plate 207 is suspended on a transverse arm 215 (Figs. 10, 16 and 18) which is pivotally connected at one side to a stud 216 projecting from a boss 217 formed in the bracket 55 and bolted at its opposite side as at 218 to a bracket 219 carried by the bracket 55.

As illustrated in Figs. 15 and 17, the forward end of the support 199 is tapered as at 221 to permit easy passage of the blank thereover. In a similar manner, the forward end of the bar 207 projects upwardly at an angle as at 222 to permit unrestricted passage of the blank as it is advanced. The arms 208 and 215 (Figs. 17 and 18) by reason of their pivotal mountings 209 and 216 may be simultaneously lifted with the bar 207 to permit access to the blanks located between the bars 199 and 207.

The feed bars 202 are moved back and forth by a mechanism now to be described. Each bar frame 74 is slotted as at 225 (Fig. 22) and each feed bar 202 near its rear end is secured to a block 226 which extends downwardly through the slot 225 having sliding movement therein. Block 226 is pivotally connected at 227 to a link 228 pivoted at 229 to the upper end of an arm 231 (Figs. 11 and 19) mounted on the intermediate shaft 191. Oscillation of the shaft 191 moves the arms 231 back and forth thereby sliding the feed bars 202 forwardly for a feeding stroke of the blanks and rearwardly in a return idle stroke, the spring held dogs 204 receding into their slots 203 during the latter movement.

By reason of the mounting of the feed bar frame units 74 on the plate 67 at their rear ends and upon the spacer frame 54 at their forward ends, these units may be shifted laterally to any particular distance from the center. The distance between the units is determined according to the length of the blank 71 being treated and this adjustability permits adaptation of the feed bars to the particular size of blank.

It is also desirable to shift the position of the arms 231 on the shaft 191 and this is effected by means of a threaded rod 232 (Fig. 19) passing at its center through the arm 189, this being the pivoted connection with the block 193 previously referred to, the rod being held centrally by spaced collars 233. The rod 232 at each end extends through an enlarged opening formed in the arm 231 and locknuts 234 threaded on the rod hold the arms 231 properly spaced from the center arm 189. A feather 235 is set in the shaft 191 and each of the arms 231 is provided with a featherway to permit sliding movement of the arms on the shaft.

During passage of the blank 71 under the feeding action of the bars 202, its end edges are guided along the spacer plates 200 and its central section is guided between the bars 199 and 207.

There is also provided on each side of the machine and as a part of each feeding bar unit, a guide plate 241 (Figs. 22, 26 and 27) which is bolted to the frame 74 and held against the plate 200. Projecting walls 242 formed on one side of the plate 241 hold the plate in proper position. The forward end of each guide plate 241 is beveled as at 243 to guide the blank therebeneath and over a shoulder 244 formed in the frame 74 adjacent the slot 201.

Blocks 245 are positioned in slots 246 which are formed at spaced intervals along the guide plate 241 and leaf springs 247 fastened to the top of the plate project over the upper surface of the block 245 and yieldingly hold their bottom edges against the blank 71 resting on the shoulder 244.

In order that the blank be accurately registered at each of the operating stations there is provided a re-checking or locating device which accurately positions it independently of the positioning action of the feed dogs 204 on the feed bars 202. The re-checking features of this device comprise suitable fingers 251 (Figs. 21, 22, 25, 26, and 27) which are loosely positioned in tongue and groove vertical slots 252 formed in a block 253 secured by bolts 254 to the upper surface of the frame 74.

There are two of these blocks 253 on each side of the machine and slots 255 cut through the block 253 into which the bolts 254 extend provide adjusting means for longitudinally positioning the block relative to the feed bar frame. The fingers 251 are urged downwardly by leaf springs 256 and the rear lower end of each finger is beveled as at 257 to permit free passage of a blank thereunder. These blocks 253 are positioned adjacent the four operating stations and insure accurate registration of the blanks at such positions.

Other devices cooperate with the stop fingers 251 and positively force the blank 71 backwardly against the fingers following their transfer, by the feed bars 202, to a position just ahead of the fingers. This device comprises locating fingers 261 (Figs. 21, 22, 25, 26 and 27) pivoted on pins 262 carried by a finger plate 263 adjustably secured to the face of the bar frame 74 by bolts 264 passing through slots 265 formed in the plate. The plate 263 is also slotted at spaced intervals as at 266 to permit free movement of the locating fingers.

Each locating finger 261 is provided with an extension 267 which is adapted to be engaged by cam blocks 268 carried on a sliding bar 269 moving in a slot 271 formed in the bar frame 74. The bar 269 is retained in operating position by plates 272 secured to the face of the frame 74 and extending a short distance above the bottom edge of the sliding bar and by a strap 273 also secured to the frame and extending across the face of the slot 271 intermediate the blocks 268.

After a blank has been moved forwardly of a finger 251, as previously described, the bar 269 slides forwardly and its blocks 268 engage the projections 269 of the fingers 261 and cause them to oscillate about their pivots 262. The upper ends of the fingers 261 thereupon engage the front edge of the blank and moves it rearwardly against the stop finger 251. This insures a definite positioning of the blank at each operating station.

The bar 269 is slid back and forth by connection with the shaft 106, each bar 269 carrying spaced plates 275 to which is pivoted at 276, a connecting link 277 (Figs. 10, 16, 24, 26 and 28). Each link 277 is pivotally connected at 278 to the upper end of an arm 279 mounted on a transverse rockshaft 281 (see also Fig. 29). The shaft 281 is journaled in bearings 282 formed in the rear spacer frame 54.

The shaft 281 also carries an arm 283 which is pivotally connected to a link 284 (Figs. 19, 20 and 24), the opposite end of the link 284 being connected with an eccentric strap 285 which surrounds an eccentric 286 formed in the shaft 106. By means of this connection, oscillation is imparted to the sliding bars 269 in proper synchronism with the other operations of the machine.

To provide a more rigid construction and permit rapid adjustment of the arms 279 along their shaft 281 for different lengths of blanks, these arms 279 and the arm 283 are tied together by a threaded rod 291 which passes through openings formed in each of the rods 279. The arms 279 as they are slid laterally along the shaft 281 during such adjustment move over a feather 292 carried by the shaft.

Locknuts 293 threaded on the rod 291 provide means for locking the arms in their adjusted positions. One end of the rod 291 extends outwardly and passes through the arm 283 and the link 284 and provides the pivot for these members at this place.

*Container blank punching*

As the blank 71 (Figs. 15 and 29) is brought to rest at the two first operation stations positioned on opposite sides of the machine, a punching device at each station operates to cut a hole in the blank and to partially form the adjacent metal into a bail ear seat. In coming into position, the blank moves over a die member 301 located at each station and supported in a counter bore 302 in the upper end of a boss 303 formed as an integral part of a die plate 304 mounted upon and carried by a table 305 extending between the two stations on the upper surface of the rear spacer frame 54.

The die member 301 is provided with a central, longitudinally extending bore 306 which communicates with a similar bore 307 cut through the boss 303. The waste discs removed by the punching operation fall through these openings 306 and 307 into the flared open end 308 of a discharge pipe 309 positioned adjacent the rear wall of the spacer frame being held in place by a bracket 311 (see also Fig. 10) secured to one of the legs 52.

Each die member 301 is surrounded by a ring 313 (Fig. 29) which has sliding vertical movement on the die member and within a central opening 314 formed in a die block 315 bolted on the upper end of the boss 303. The ring 313 rests upon springs 316 located in vertical bores 317 formed in the die member 301, the lower end of each spring 316 resting upon a wall of the boss. The ring 313 by reason of the springs 316 is normally held with its upper surface flush or slightly above the upper surface of the die member 301 and forms a guide for the blank 71 as it is moved into position, a flange 318 extending from the bottom edge of the ring, resting against the block 315 at such time.

Figure 31:
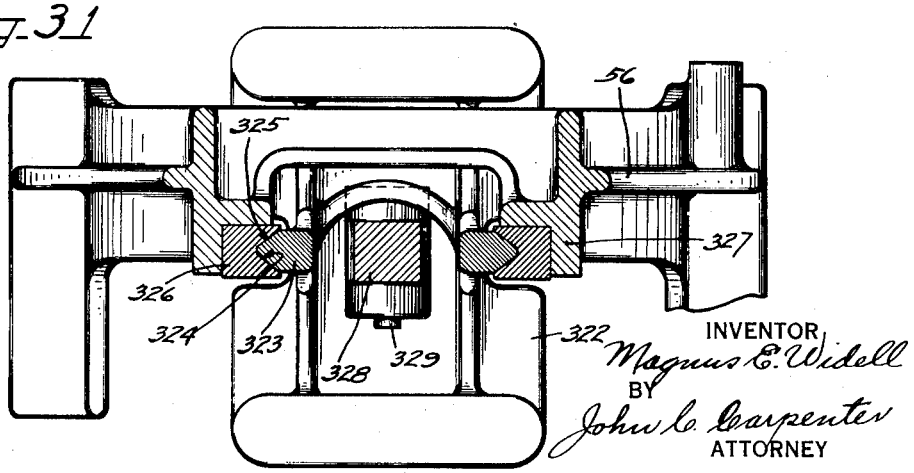
Fig. 31 is a sectional plan view taken along the broken line 31—31 in Fig. 15.

Movable punch members cooperate with the stationary die parts, at the two stations, for the punching and forming operation and these are carried on a punch plate 321 (Figs. 15 and 29). This plate is bolted to the under surface of a sliding member 322 (see also Fig. 31) provided with vertical extensions 323 formed with beveled outer edges 324 sliding within V-shaped slots 325 extending vertically along the inner faces of spaced gibs 326 securely bolted in right angled seats 327 formed in the bracket 56. This construction permits vertical movement of the sliding member while insuring exact vertical alignment.

The member is raised and lowered by connection with the shaft 57, a boss 328 formed as an integral part of the slide 322, providing a connection for a pin 329 pivotally connecting with a trunnion 331 having a threaded stem 332 for adjustable connection with a pitman 333 which is enlarged as an eccentric strap 334 encircling an eccentric 325 carried by the shaft 57. Rotation of the shaft 57 through the described connections raises and lowers the sliding members 322 and effects the punching and forming operations at the two first stations.

The punch member 321 adjacent its rear edge is formed with a pair of downwardly extending bosses 341 to each of which is bolted a collar 342 which encircles a center block 343 also bolted to the boss and provided with a downwardly projecting punch 344. A forming ring 345 encircles the punch 344 and is slidingly retained within the collar 342, a flange 346 formed in the ring 345 normally abutting against an annular shoulder 347 formed interiorly of the collar 342.

Spring 348 are retained in vertical bores 349 cut in the block 343 and are interposed between the lower surface of the boss 341 and the upper surface of the ring 345. These springs provide a yielding cushion for the ring 345 which clamps against and holds the blank 71 during the punching and drawing operation.

Beginning with the downward movement of the punch member 321, the ring 345 first engages the blank 71 and clamps it against the upper surface of the ring 313 after which, continued downward movement forces the punch 344 through the blank forming a hole 350 by cutting out a waste disc and forcing it into the opening of the die member 301. The lower surface of the ring 345 cooperating with the upper surface of the member 301 forms or shapes the interposed metal of the blank into a raised panel 351 (Fig. 6). This is adjacent the opening 350 and connects with an annular conical surface 352, the parts 351 and 352 thus forming an incompleted seat for a bail ear.

The waste disc falls downwardly through the die member 301 and the die plate 304 and into the hopper 308 of the chute 309 through which it falls into a box 353 (Fig. 10) supported on brackets 354 bolted to the rear leg 52.

As each punch member 321 is raised, the springs 348 and 316, acting through the respective rings 345 and 313, strip off the blank from the punching and blanking members and leave it in position to be moved by the feed bars 202 into the second pair of operating stations. During this passage of the blank, the same is supported on horizontal straps 355 (Fig. 29) each carried on a block 356 mounted on the collar 315 and upon a block 357 mounted on a collar 358 bolted to a boss 359 formed as an integral part of the die plate 304 and located along its forward edge.

Container blank ear seat shaping

The boss 359 (Fig. 29) and collar 358, just referred to, comprise parts of the ear seat shaping station, there being a pair of such stations spaced one on either side of the machine. As the container blank 71 is brought to rest at this station, it is moved over the surfaces of a pair of forming dies 361 each supported or seated in a counter bore 362 formed in the upper surface of the boss 359 and held in position by the collar 358.

A sliding pin 363 is located centrally of the die 361 and an enlarged head 364 thereof rests upon the upper end of a spring 365 held within a vertical bore 366 formed in the boss 359 by a threaded nut 367 engaging the die plate 304 and closing the bottom end of the bore 366. A counter bore 368 formed in the die plate 304 permits access to this nut 367. The upper end of the pin 363 is recessed as at 369.

The movable punch parts utilized at these two ear seat shaping stations are also carried by the punch member 321, a pair of bosses 371 being formed along the forward edge thereof. A punch block 372 is bolted to each boss 371 and is provided with an extended forming punch 373 having a shaped extremity 374 adapted to interlock and fit within the recess 369 of the pin 363 when in lowered position. A collar 375 is also carried on each block 371 and encircles the punch block 372 being bolted to the boss 371 of the punch member 321.

A sliding forming ring 376 encircles the punch 373 and has sliding movement within the collar 375, a flange 377 thereof engaging at certain periods an annular shoulder 378 formed on the bottom edge of the collar 375. Springs 379 are located within vertical bores 381 formed in the block 372 and are interposed between the lower surface of the boss 371 and the upper surface of the ring 376. These provide a yielding backing for the ring 376.

As the punch 321 descends, the ring 376 first engages the upper surface of the blank 71 and yieldingly clamps it against the upper surface of the die member 361. Descent of the punch member 321 continues forcing the punch 373 into the opening 350 and in cooperation with the die member 361 moves the inner edge of the panel 351 downwardly thereby bending it into a vertical annular flange 385 (Fig. 7).

The ear seat is now fully formed and the return of the punch member 321 to its upward position is accompanied by a stripping action of the sliding pin 363 under the influence of its spring 365 and by a similar stripping action of the ring 376 under the influence of its springs 379. The blank 71 is then advanced by the feed bars 202 through an idle station and into the third operating station which is the ear assembling station.

Container blank ear assembling station

At the assembling stations (Fig. 13 and 16) the blank is brought to rest with each ear seat flange 385 aligned with a collar 391 having a vertical channel 392 in the top end of which the flange comes to rest. Each collar 391 is supported on a tubular member 393 formed on the inner end of a cross feed frame 394 carried on a bracket 395 bolted to the forward spacer frame 54. The frame 394 has adjustment transversely of the machine and relative to its bracket 395, slots 396 (Fig. 18) cut in the frame for this purpose accommodating bolts 397 threadedly secured in the bracket.

The blank, so positioned, is beneath a clamping head carried by a vertically moving slide operating in the bracket 55. A punch member 401 (Figs. 13 and 16) is provided with upwardly projecting extensions 402 similar in shape to the extensions 323 of the sliding member 322, these extensions 402 having vertical movement within gibs 403 bolted to the bracket 55.

The punch member 401 is formed with a central boss 404 which provides a pivotal seat for a pivot pin 405 connected with a block 406 which has a threaded shank 407 adjustably secured within the lower end of a pitman 408 which is enlarged at its upper end into an eccentric strap 409 which encircles an eccentric 411 keyed to the shaft 57. Rotation of the shaft 57 through the described connections raises and lowers the punch member 401 which carries the two clamping heads for the assembling station and certain movable parts for a subsequent station.

Each clamping head comprises a floating tubular member 411 (Figs. 13 and 16) which has sliding movement on a pilot pin 412 secured by a nut 413 to a bracket 414 bolted to the rear side of the punch member 401. The tubular member 411 is provided with opposed extended slotted lugs 415 in each slot of which is located a vertically disposed guide bolt 416 which is threadedly secured to a head base 417 carried by the bracket 414. The bolts 416 prevent rotation of the tubular member 411 on its vertical center but allow for vertical sliding movement of the head. Each bolt 416 has an enlarged head 418 which forms a stop for the lugs 415 when the tubular member 411 is in lowered position at which time it is held downwardly by a spring 419 which surrounds the tubular member and extends between the base 417 and the lugs 415.

This construction of clamping head, of which there are two, as illustrated in Fig. 13, provides yielding clamping members which are normally held in lowered position when the member 401 is in raised position. After the container blank has come to rest at the assembling stations and the slide 401 is lowered, the lower edges of the tubular members 411 engage the blank clamping it on the collars 391.

The container blank so clamped is now in position to receive two bail ears, one ear into each of the bail ear seats. These bail ears are automatically supplied and fed into proper position for alignment with the seats while the container blank is held at the assembling stations and the feeding of the ears will now be described.

*Bail ear magazine and delivery*

The bail ears are prepared prior to being received into the present apparatus as a two-part ear comprising an ear body 425 (Fig. 8) formed with an outwardly extending annular flange 426 to which there is attached a bottom member 427 having an annular flange 428 which is loosely engaged with the flange 426. The parts 425 and 427 while thus only loosely assembled cannot come apart, this two-part ear being hereinafter referred to by the numeral 430.

The bracket 56 at the rear end of the machine supports a housing 431 (Figs. 10 and 11) which extends laterally of the machine and is connected with the blank feeding frame parts by vertical tie-rods 429 extending between the housing 431 and each bracket 83. Each side of the housing has mounted thereon a circular base 432 which provides a support for each bail ear magazine.

Figure 34:
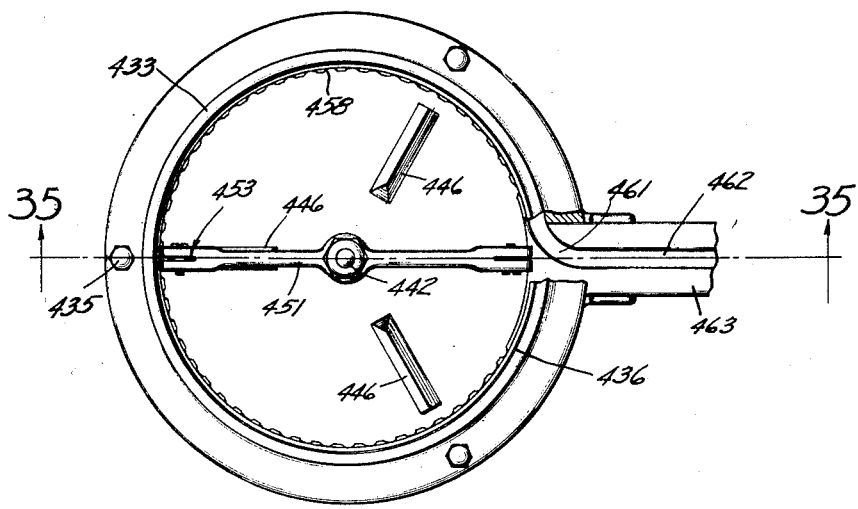
Fig. 34 is a top plan view of one of the bail ear magazines.
Figure 35:
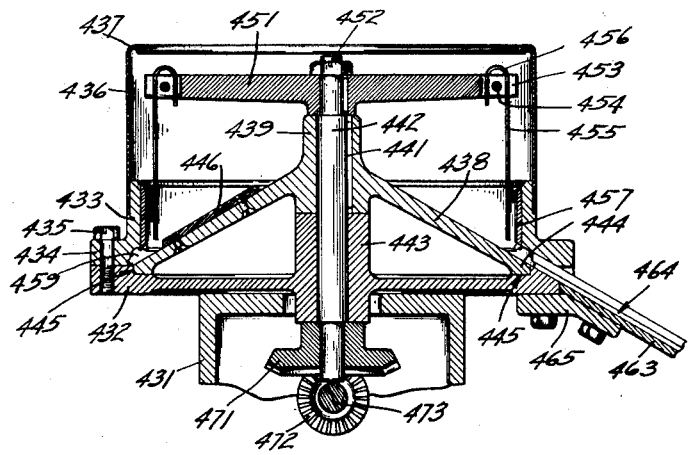
Fig. 35 is a transverse sectional view taken along the line 35—35 in Fig. 34.

Each magazine comprises a collar 433 (Figs. 34 and 35) having an annular flange 434 which is secured to the base 432 by bolts 435. A sheet iron circular shell 436 extends upwardly from the collar 433 to which it is secured and terminates in an upper curled edge 437. This cylindrical member provides a hopper for the bail ears 430.

The ears when in the magazine rest upon a conical disc 438 which extends upwardly into a boss 439 keyed at 441 to a vertical shaft 442 journaled in a boss 443 formed in the base 432, the boss 439 resting upon the boss 443. The outer lower edge 444 of the disc 438 turns within an annular groove 445 formed in the base as the disc rotates within the magazine. Beveled baffles 446 are secured to the upper surface of the disc 438 at spaced intervals and as the disc turns these baffles move through the mass of bail ears in the magazine and turn them over and over.

An arm 451 is keyed to the upper end of the shaft 442 and is held in position by a nut 452, the arm extending laterally on either side of the shaft to within a short distance of the inner wall of the cylinder casing 436. The ends of the arm 451 are slotted as at 453 and a screw 454 is threadedly secured in the arm and extends across the slot. Vertical stirring rods 455 having hooked ends 456 are positioned in the slots 453 and are carried by the arm 451. As the shaft 451 and disc 438 turn the arm 451 carries the stirring rods 455 in a circular path of travel within the mass of ears resting upon the disc 438 and within the magazine.

A cylindrical ring 457 is positioned within the collar 433 and is provided on its interior surface with corrugations 458. The bail ears as they are stirred by the rods 455 and as they are turned over and over by the baffles 446 are caused to strike against the corrugated surface 458 of the ring 457 and in this way are sufficiently agitated to maintain a sufficiently large percent of ears in proper upright position on the conical surface of the disc.

An annular channel 459 is formed interiorly of the collar 433, the top and side walls of the channel being shaped to receive and nicely fit the body part 425 of a bail ear 430. When an ear comes into upright position upon the conical disc 438 and moves downwardly toward its lower edge, it is permitted to enter into the annular channel 459 after which it is held in upright position and is moved around a circular path of travel by the rotating disc 438. Ears which are upside down and improperly positioned cannot enter the channel. The bail ears which do enter the channel 459 are thus brought into processional order and in this way are advanced until at the end of the channel, when they move into a circular passageway 461 cut in the base 432 at the inner edge of the magazine.

The passageway 461 communicates with an inclined chute 462 formed in a guide plate 463, the chute having recessed walls 464 (Figs. 18, 32 and 35) which keep the ears in a single row as they move downwardly under the action of gravity. Each guide plate 463 is fastened to each base 432 at its upper end by means of a bracket 465 and at its lower end it rests on a block 466 supported by an extension 467 of the bracket 395.

Each shaft 442 carries at its lower end a bevel gear 471 (Figs. 11 and 35) which meshes with a gear 472 secured to a transverse shaft 473 journaled in bearings 474 carried by the housing 431. The shaft 473 also carries a bevel gear 475 which meshes with a similar gear 476 (see also Fig. 15) secured to one end of the shaft 57. Rotation of the shaft 57 through the connecting shaft 473 imparts constant rotation to the disc 438 and arm 451 of each of the ear magazines.

As bail ears approach the bottom end of the chute 463, the foremost bail ear engages a pair of spaced spring-held fingers 481 (Figs. 10, 18 and 32) pivoted at 482 on the upper surface of the chute 463. Each finger 481 carries a downwardly extending pin 483 and the two pins of the pair of fingers 481 project into the chute from opposite sides. A spring 484 is connected between these pins and normally holds the forward ends of the fingers 481 in closed or ear engaging position. The forward end of each finger is pointed and projects inwardly to hold the line of ears. The lowermost bail ear is engaged by a feeding device and forcibly moved past the fingers 481 which give way under the yielding influence of their spring 484 as will now be described.

Figure 18:
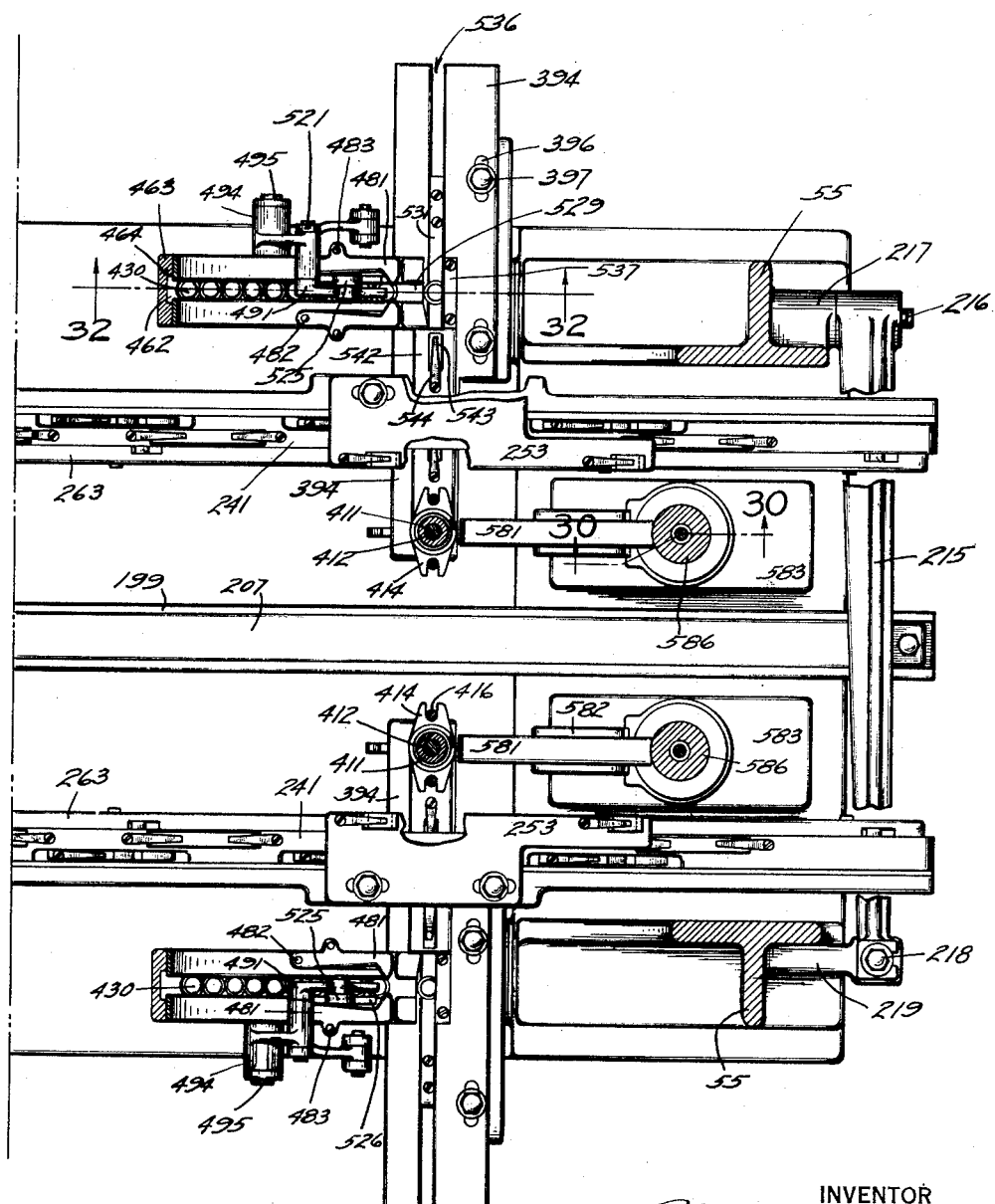
Fig. 18 is a view similar to Fig. 17 showing the front half of the apparatus being taken along the line 18—18 in Fig. 16, this view taken in conjunction with Fig. 17 illustrating the complete sectional plan view.
Figure 32:
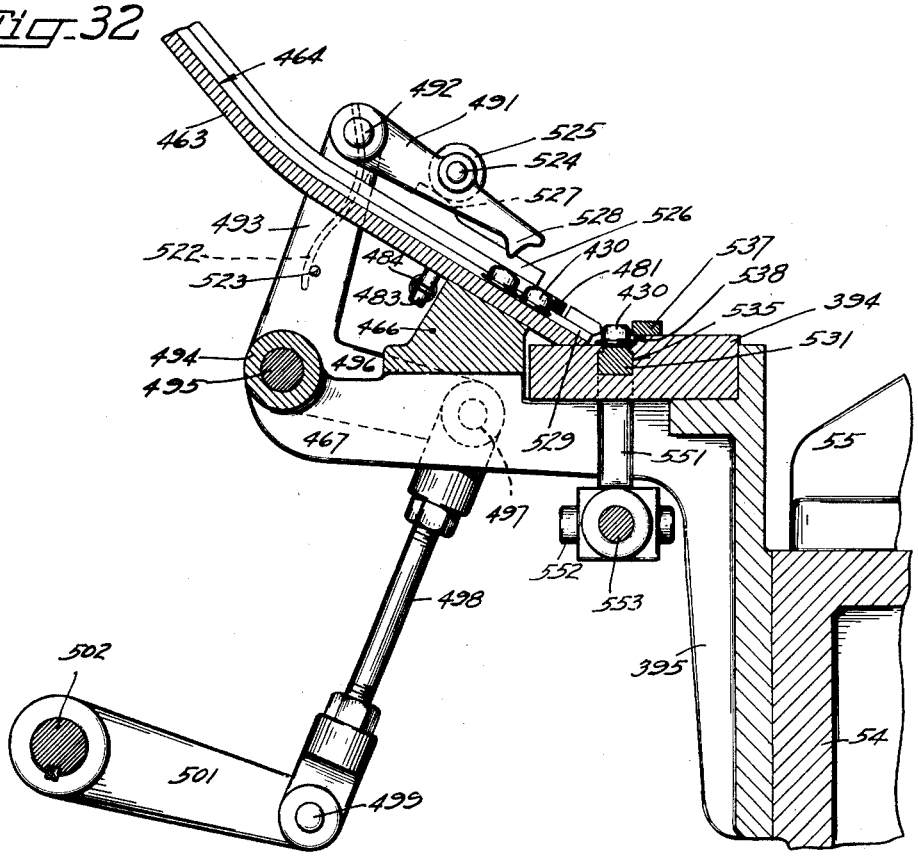
Fig. 32 is an enlarged longitudinal sectional view taken along the line 32—32 in Fig. 18.

This feeding device is illustrated in Figs. 10, 18 and 32 and comprises an arm 491 secured on a pin 492 which has a slight oscillation in the upper end of an arm 493 of a bellcrank lever 494 pivoted on a pin 495 secured in the extension 467 of the bracket 395. The bellcrank lever 494 is also provided with an arm 496 to which is pivotally secured at 497 an adjustable link 498 pivoted at 499 to an arm 501 secured to a rockshaft 502.

The shaft 502 (Figs. 10, 16 and 20) is journaled in bearings 503 formed in brackets 504 projecting rearwardly from a frame 505 carried on the upper surface of the bed 51 intermediate the spacer frames 54. The shaft 502 also carries an arm 506 which supports a cam roller 507 (Fig. 16) which operates in a cam groove 508 formed in a cam 509 keyed to one end of a horizontal shaft 511 journaled in a bearing 512 formed in the frame 505 and in a bearing 513 formed in the front spacer frame 54.

The shaft 511 also carries a face cam 514 on the hub of which is secured a sprocket 515 over which operates a chain 516, the chain also passing over a sprocket 517 secured to the shaft 123. By means of this connection the bellcrank lever 494 (Fig. 32) is oscillated on its shaft 495 and the arm 491 is moved back and forth over the lower end of the ear chute.

The pin 492 (Figs. 10, 18 and 32) is loose in the arm 493 and carries on its end a collar 521 pinned thereto, and a round spring 522 has one end passed through collar and pin. The lower end of this spring engages a pin 523 projecting outwardly from one face of the arm 493 and this spring urges the pin 492 and the arm 491 secured thereto in a clockwise direction as viewed in Fig. 32.

The arm 491 carries intermediate its ends a pin 524 on which is rotatably mounted a cam roller 525 which engages a cam plate 526 secured to the lower end of the chute 463 intermediate the fingers 481. The spring 522 thus holds the cam roller 525 against the cam block 526 at all times. When the upper end of the arm 493 is in its raised position, the cam roller 525 rests upon a raised surface 527 formed in the block 526 and in this position a forward pointed extremity 528 of the arm 491 is lifted clear of the bail ears 430 resting in the chute 463.

As the bellcrank lever 494 is oscillated in a clockwise direction, the arm 491 is moved downwardly and at the same time the roller 525 moves off of the projection 527 and the forward end 528 of the arm thereupon engages behind the lowermost ear 430 held at such time by the fingers 481. Continued downward movement of the arm forces the lowermost bail ear 430 from between the fingers 481 and moves it along a guideway 529 (Fig. 18) which forms the terminal of the chute. The ear is finally positioned on top of a horizontal bar 531 (see also Figs. 13 and 32) constituting an element of the bail ear cross feed.

*Bail ear cross feed*

The bar 531 of each cross feed has sliding movement within a horizontal groove 535 (Figs. 13, 14, 18 and 32) formed in its corresponding frame 394. The outermost portion of each of these frames is cut out as at 536 to form a slot (Figs. 13 and 18) which aligns with the groove 535. The bail ear 430 coming to rest on the upper surface of the bar 531 is stopped by a guide bar 537 secured on the frame 394 adjacent one side of the groove. The frame 394 on one side of the groove (Fig. 32) is higher than on the other side and the bar 537 overhanging one wall of the groove provides a passageway for the flange of the ear along one side of travel, guiding the ear into an upper groove 538 (Fig. 14) also cut in the frame 394 and connecting with the groove 535. A plate 539 is mounted on and carried by the frame 394 and this is also slotted to provide a longitudinal groove for the upper part of the ear as it is moved by the bar 531.

Each bar 531 (Fig. 13) is provided with a shoulder 530 formed near its longitudinal center and the inner or forward end of each bar is also provided with two spaced slots 540 in each of which there is pivotally mounted a spring held feed dog 541.

The bail ear 430 as brought into its initial position on the bar 531 as previously described is in advance of the shoulder 530, the bar 531 at such time being in its outer or rear position. A pair of guide blocks 543 (Figs. 13, 14 and 18) project through slots formed in each plate 539 and are normally held in lowered position by springs 544 mounted on the plate. These spring held blocks rest on the upper surface of the bail ears 430 which are advanced with the bars 531 on their forward movement. These blocks frictionally prevent backward movement of the ears when the bars 531 retreat on their return stroke.

As illustrated in Fig. 13, the rear bail ear 430 has been moved by engagement of the shoulder 530, from its initial position on the bar 531 a distance equal to the feeding stroke of the bar and has come to rest beneath the rear block 543. At the same time, the bail ear in advance has been moved by engagement with the feed dog 541 from the rear block 543 to a position beneath the forward block. The bail ear 430 which is still in advance of the other two ears mentioned, has in its turn been moved by engagement with the forward feed dog 541 from the forward block 543 into the opening 392 of the boss 391.

It will be understood that a continuous succession of bail ears is thus intermittently advanced by the bars 531 from receiving positions adjacent the ends of the chutes 463 and into delivering positions in the boss openings 392.

Each cross feed bar 531 is operated by connection with the shaft 511, the bar 531 carrying a downward extension 551 (Fig. 13) pivotally connected at 552 to a link 553 pivoted at 554 to the upper end of an arm 555. Each arm 555 (Figs. 13, 16 and 20) is pivoted on a pin 556 carried in a bracket 557 formed in the frame 505. The arm 555 is extended as at 558 to provide a pivot 559 for connection with an arm 561 formed at its opposite end into an eccentric strap 562 which encircles an eccentric 563 carried by the shaft 511.

It will be understood that there are two cross feed units, one for each line of bail ears, each feed bar 531 having a complete system of arms and levers and having its own eccentric 563. The two eccentrics are formed adjacent one another, as clearly illustrated in Figs. 16 and 20. By means of these eccentrics and the described connections, each feed bar 531 is moved back and forth and the bail ears 430 on each side of the machine are intermittently advanced through their four stations and are finally brought into axial alignment with the bail ear seat in the positioned blank 71 as previously described.

*Bail ear assembling*

As each bail ear is moved into each passageway 392 (Fig. 13) it is brought to rest upon the upper surface of a vertical rod 565 having sliding movement within a vertical bore 566 formed in the boss 393 in alignment with the opening 392. Each bar 565 is adjustably mounted on a horizontal cross head 567, the rod being held in adjusted position by locknuts 568.

The cross head 567 (Figs. 13, 16 and 20) is formed with the pair of downwardly extending sleeves 569 which encircle and have sliding movement upon vertical pilot posts 571 mounted in bosses 572 formed as an integral part of the frame 505. The cross head 567 during vertical movement is held thus and guided in aligned position on the pilot posts, this insuring easy sliding movement of the rods 565 within their vertical bores 566.

As the cross head 567 raises the two rods 565 the two bail ears 430 resting thereupon are moved upwardly through their passageways 392 and the upper shell part 425 of each bail ear is inserted within the formed bail ear seat 385 of the clamped container blank 71. This constitutes an assembly of the bail ear and the container blank, the assembled relation of these parts being illustrated in Fig. 8. It will be observed that the flange 385 of the bail ear seat tightly fits the outer part of the ear body 425 and the flange 428 of the part 427 projects upwardly into engagement with the tapered wall 352 of the bail ear seat.

The lifting of the bail ears into assembled position is effected by cam action directed against the cross head 567. The cross head for this purpose is formed with a downwardly extended wall 575 (Fig. 16) which carries a horizontal pin 576 on which is mounted a cam roller 577 located within a cam groove 578 formed in the face cam 514. Rotation of the shaft 511 and the cam 514 thus raises and lowers the bars 565 and inserts the bail ears into assembled position in the container blank.

*Bail ear clinching*

The blank with its assembled bail ears is moved from the assembling stations upon the following reciprocation of the feed bars 202 and is brought to rest at the final operating stations. During this final passage of the blank between operating stations, it is further supported by a horizontal plate 581 (Figs. 16 and 30) carried by a bracket 582 bolted to a die block 583 mounted on the upper surface of the forward spacer frame 54.

This die block carries the lower part of the clinching mechanism which comprises a central anvil 584 (Fig. 30) having a stem 585 extending downwardly for connection with the die block 583. As the blank 71 with its assembled bail ears is moved into position at this station, it passes over the upper surface of a vertically movable collar 586 provided with an extending flange 587 which engages, at such time, an annular shoulder 588 formed in a retainer ring 589 encircling the collar 586 and resting upon the die block 583 to which it is bolted.

At such time the upper surface of the collar 586 extends above the upper surface of the anvil 584. A transverse slot 591 is cut across the upper surface of the collar permitting unrestricted passage of the lower part of the inserted bail ear projecting below the blank 71. The collar 586 is normally retained in upward position by springs 592 located in vertical channels 593 formed in the collar. The collar 586 is also provided with vertical bores 594 and pilot pins 595 set in the block 583 extend within these bores. This insures perfect alignment of the collar 586 during its vertical movement and prevents turning thereof on the anvil 584, thus holding the slot 591 in proper position.

The upper part of the clinching mechanism is carried by the punch member 401 and comprises a punch plate 601 projected into a central boss 602 on which is positioned a clinching head 603 secured by bolts 604 to the punch plate 601. The clinching head is in raised position at the time the blank 71 is brought into the clinching station and in this raised position a knockout pad 605 formed on the lower end of a vertical knockout rod 606 rests in the lower part of a vertical chamber 607 formed centrally of the clinching head.

The rod 606 extends upwardly into the punch plate and a nut 608 threadedly secured on the upper end of the rod is located within a depression 609 formed in the punch plate 601. The location of the nut on the rod determines the vertical position of the pad 605 relative to the clinching head 603. A spring 611 encircles the rod 606 being located within the chamber 607 and confined between a wall of the punch plate 601 and the pad 605.

Figure 30:
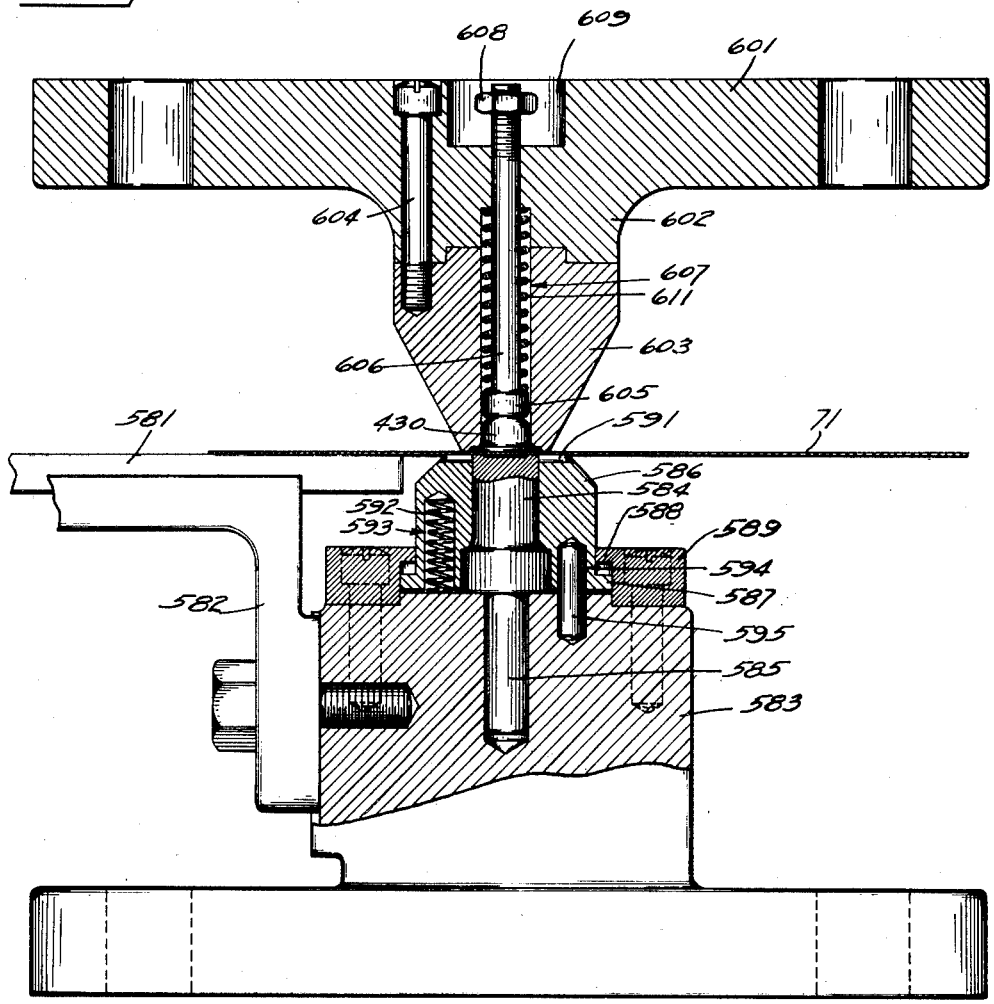
Fig. 30 is an enlarged longitudinal sectional view taken along the broken line 30—30 in Fig. 18.

As the punch member 401 is lowered each clinching head carried thereby moves downwardly and its knockout pad 605 first engages the upper surface of a bail ear 430 positioned beneath and holds the same firmly against the anvil 584 as the clinching head forces the flanges of seat and ear 385, 426 and 428 into a horizontal plane forming a rigid seal 612 between the bail ear and the blank as illustrated in Fig. 9. The lower surface of the clinching head 603 is shaped to effect the proper seaming action of the parts, the collar 586 receding as the reshaping of the flanges of bail ear and blank take place until the final position is reached, as shown in Fig. 30.

As the punch member 401 returns on its upward stroke, the two collars 586 lift the blank and its ears off of the anvils 584 and further upward movement separates the clinching heads 603 from the blank, the springs 611 operating at such time to hold the knockout pads 605 until such time as the ear is clear of the clinching body.

The final feeding stroke of the feed bars 202 then takes place and the blank 71 with its bail ears 430 secured thereto is moved toward the right (Fig. 16) between the bars 207 and 199 and is discharged out of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for preparing container blanks, the combination of transfer devices for advancing container blanks through the machine, forming means for producing bail ear seats in said blanks, assembling instrumentalities for positioning formed bail ears on said seats, said forming means and said assembling instrumentalities being arranged at pairs of stations along and at each side of the center of the path of the blanks, power means arranged above and between said pairs of stations, power means arranged below and between said pairs of stations, and cross-head elements extended from said power means to said stations and carrying the movable forming means and assembling instrumentalities.

2. In an apparatus for preparing container blanks, the combination of transfer devices for advancing container blanks through the machine, means for producing bail ear seats in said blanks, assembling instrumentalities for positioning formed bail ears on said seats, means for securing said ears in said blanks, said seat-forming means and said positioning instrumentalities and said securing means being arranged at pairs of stations along and at each side of the center line of the path of the blanks, power means arranged above and between said pairs of stations, power means arranged below and between said pairs of stations, and cross-head elements extended from said power means to said stations and carrying the movable forming means and assembling instrumentalities.

3. In an apparatus for preparing container blanks, the combination of transfer devices for advancing container blanks through the machine, a magazine for bail ears, feeding devices for feeding said ears from said magazine, means for producing bail ear seats in said blanks, and assembling instrumentalities for positioning said formed bail ears on said seats.

4. In an apparatus for preparing container blanks, the combination of transfer devices for advancing container blanks through the machine, a magazine for bail ears, feeding devices for feeding said ears from said magazine, means for producing bail ear seats in said blanks, assembling instrumentalities for positioning said formed bail ears on said seats, and means for securing said ears in said blanks.

5. In an apparatus for preparing container blanks, the combination of transfer devices for advancing container blanks through the machine, a magazine for two-part bail ears, feeding devices for feeding said ears from said magazine, means for producing bail ear seats in said blanks, assembling instrumentalities for positioning said formed bail ears on said seats, means for securing said ears in said blanks while rigidly securing the bail ear parts together.

6. In an apparatus for preparing container blanks, the combination of transfer devices for advancing container blanks through the machine, a magazine adapted to hold a stack of container blanks, devices for successively separating individual blanks from said magazine and positioning them into said transfer devices, means for producing bail ear seats in said blanks, and assembling instrumentalities for positioning formed bail ears on said seats.

7. In an apparatus for preparing container blanks, the combination of transfer devices for advancing container blanks through the machine, said transfer devices embodying spaced feed bar units and actuating instrumentalities, means for adjusting said units and instrumentalities for position relative to the size of container blank used, and means for securing bail ears in said container blanks as they are so advanced.

8. In an apparatus for preparing container blanks, a blank magazine adapted to hold a stack of container blanks, a pair of bail ear hoppers each adapted to contain a charge of bail ears, devices for successively withdrawing individual blanks from said blank magazine, devices for successively separating individual bail ears from each of said bail ear magazines, a pair of assembling stations, transfer devices for receiving a withdrawn container blank and advancing it to said stations, a pair of feeding devices each adapted to receive a separated bail ear and feed it to one of said stations, and means arranged at said stations for uniting two bail ears with each container blank.

9. In an apparatus for preparing container blanks, the combination of transfer devices for advancing container blanks through the machine, means for punching holes in said advanced container blank and shaping the surrounding metal to form bail ear seats, feeding devices for feeding formed bail ears to said formed seats, and means for securing said bail ears in said container blank by interlocking parts of said bail ears with parts of said bail ear seats.

10. In an apparatus for preparing container blanks, the combination of transfer devices for advancing container blanks through the machine, means for punching holes in said advanced container blanks, feeding devices for feeding formed bail ears, means for inserting said bail ears through said holes in said container blanks, and means clinching said bail ears to said blanks about said holes.

11. In an apparatus for preparing container blanks, the combination of transfer devices for advancing container blanks through the machine, means for punching holes in said advanced container blanks, feeding devices for feeding bail ears formed of two connected parts to said holes and means inserting said bail ears through said holes and compressing the parts of the bail ear together with the material of the blanks around said holes into mutual interlocked relation.

12. In an apparatus for preparing container blanks, the combination of transfer devices for advancing container blanks progressively past pairs of operating stations, bail ear seat forming means arranged at a pair of said stations, means for securing bail ears to the formed seats arranged at a succeeding pair of said stations, and power means arranged centrally and intermediate said stations, and cross-head elements extended from said power means to each of said stations.

13. In an apparatus for preparing container blanks, the combination of transfer devices for advancing container blanks through the machine and past pairs of operating stations, perforating means located at a pair of said stations, bail ear seat forming means located at a second pair of said stations, and bail ear attaching means located at a third pair of said stations.

14. In an apparatus for preparing container blanks, the combination of transfer devices for advancing container blanks through the machine and past pairs of operating stations, a pair of blank perforating means arranged at a said station, and a pair of means located at a second said station for interlocking bail ears in the perforations in said blanks.

15. In an apparatus for preparing container blanks, the combination of transfer devices for advancing container blanks through the machine, bail ear feeding means arranged at both sides of the movement of said blanks through said machine, and means receiving said bail ears from said bail ear feeding means and interlocking said bail ears with said container blanks.

16. In an apparatus for preparing container blanks, the combination of transfer devices for advancing container blanks through said machine and past a plurality of operating stations, bail ear seat forming means arranged at a said station, a pair of means arranged at opposite sides of the travel of the blank for feeding formed bail ears into registration with said seats, and means securing said bail ears to said seats at a second said station.

17. In an apparatus for preparing container blanks, the combination of transfer devices for advancing container blanks through said machine and past a plurality of operating stations, bail ear seat forming means arranged at a said station, a pair of means arranged at opposite sides of the travel of the blank for feeding formed bail ears into registration with said seats, and means interlocking said bail ears with said bail ear seats at a second said station.

MAGNUS E. WIDELL.